United States Patent
Adler et al.

(10) Patent No.: US 11,163,292 B2
(45) Date of Patent: Nov. 2, 2021

(54) APPARATUS, METHOD AND COMPUTER-READABLE MEDIUM FOR CONTROLLING A MACHINE USING A MOBILE COMMUNICATION DEVICE

(71) Applicant: Deere & Company, Moline, IL (US)

(72) Inventors: Rasmus Adler, Kaiserslautern (DE);
Daniel Schneider, Kaiserslautern (DE);
Patrik Feth, Kaiserslautern (DE);
Martin Kremmer, Mannheim (DE);
Benjamin Neermann, Mannheim (DE);
Stefan Volz, Mannheim (DE); Norbert Fritz, Ilvesheim (DE); Hans Juergen Nissen, Mannheim (DE); Florian Reinmuth, Mannheim (DE)

(73) Assignee: Deere & Company, Moline, IL (US)

( * ) Notice: Subject to any disclaimer, the term of this patent is extended or adjusted under 35 U.S.C. 154(b) by 61 days.

(21) Appl. No.: 15/963,189

(22) Filed: Apr. 26, 2018

(65) Prior Publication Data
US 2018/0314230 A1 Nov. 1, 2018

(30) Foreign Application Priority Data
Apr. 28, 2017 (EP) .................................. 17168635

(51) Int. Cl.
*G05B 19/409* (2006.01)
*G05B 19/414* (2006.01)
(Continued)

(52) U.S. Cl.
CPC ............ *G05B 19/409* (2013.01); *A01B 71/02* (2013.01); *A01D 34/008* (2013.01);
(Continued)

(58) Field of Classification Search
None
See application file for complete search history.

(56) References Cited

U.S. PATENT DOCUMENTS

| 2011/0021272 A1* | 1/2011 | Grant .................... A63F 13/10 463/30 |
| 2011/0209551 A1* | 9/2011 | Helldorfer ........ B60R 21/01332 73/658 |

(Continued)

FOREIGN PATENT DOCUMENTS

| DE | 102014211712 A1 | 2/2015 |
| EP | 3165974 A1 | 11/2015 |

*Primary Examiner* — Bernard G Lindsay
(74) *Attorney, Agent, or Firm* — 2SPL Patent Attorneys PartG mbB; Kieran O'Leary

(57) ABSTRACT

Embodiments relate to apparatuses, methods and computer programs for controlling a machine. The apparatus is suitable for a mobile communication device for providing a sensor input signal to a machine control entity to control a machine. The apparatus comprises one or more sensor modules for providing first user input sensor data and second user input sensor data. The apparatus further comprises a control module configured to determine the sensor input signal based on the first user input sensor data and the second user input sensor data. The control module is further configured to provide the sensor input signal for sensor data processing to the machine control entity to control at least one of a force transmission interface of the machine for an external component and an engine of the machine via an interface.

9 Claims, 7 Drawing Sheets

(51) Int. Cl.
*G05B 19/042* (2006.01)
*G08C 17/02* (2006.01)
*A01D 34/00* (2006.01)
*A01B 71/02* (2006.01)

(52) U.S. Cl.
CPC ..... *G05B 19/0423* (2013.01); *G05B 19/0426* (2013.01); *G05B 19/414* (2013.01); *G08C 17/02* (2013.01); *G05B 2219/36159* (2013.01); *G08C 2201/93* (2013.01)

(56) References Cited

U.S. PATENT DOCUMENTS

| | | |
|---|---|---|
| 2013/0147611 A1 | 6/2013 | Brendel |
| 2014/0114478 A1 | 4/2014 | Williams et al. |
| 2015/0127208 A1* | 5/2015 | Jecker ............... B62D 1/00 701/23 |
| 2015/0366124 A1* | 12/2015 | Kremmer ............ A01B 59/06 701/2 |
| 2016/0048249 A1* | 2/2016 | Chen ................ G06F 3/011 701/2 |
| 2016/0103009 A1* | 4/2016 | Milton ............... G01F 22/00 73/313 |
| 2017/0228145 A1* | 8/2017 | Schneider ........... A01B 59/002 |
| 2017/0248946 A1* | 8/2017 | Ogura ............... A01B 69/00 |
| 2017/0307395 A1* | 10/2017 | Kim ................. B60R 1/00 |
| 2019/0023129 A1* | 1/2019 | Huger ............... G07C 5/008 |

* cited by examiner

Slide&Circle

Slide&Tilt

APPARATUS, METHOD AND COMPUTER-READABLE MEDIUM FOR CONTROLLING A MACHINE USING A MOBILE COMMUNICATION DEVICE

TECHNICAL FIELD

Embodiments relate to apparatuses, methods and computer programs for controlling at least one of a force transmission interface and an engine of a machine, more specifically, but not exclusively, based on providing a sensor input signal to a machine control entity.

BACKGROUND

This section introduces aspects that may be helpful in facilitating a better understanding of the invention(s). Accordingly, the statements of this section are to be read in this light and are not to be understood as admissions about what is in the prior art or what is not in the prior art.

Mobile communication devices, especially smartphones and tablet computers, have started transforming large parts of today's life. Especially the rise of mobile communication devices that allow an installation of additional software, so called apps (applications), allow mobile communication devices to be used in a multitude of different scenarios. Applications range from simple messaging, to navigating, to controlling a smart home, while being a large distance away.

All kinds of devices, e.g. kitchen devices, vehicles, or lighting, have recently been equipped with additional communication devices. Many previously unconnected devices are now controllable or observable remotely, e.g. from a mobile communication device or a computer. Even home security, ranging from connected locks to wireless surveillance pods, are now available from the mobile communication device of your choice. Apps sometimes enable an easier controlling and observation of such devices.

The controlling of machines, e.g. of heavy machinery, such as agricultural equipment, industrial machines, or commercial vehicles, is often built on a framework of reliable components. A number of certification standards, such as International Standardization Organization (ISO) 25119 and ISO 12100 regulate a safety and reliability of such controlling. Standardized testing and functional verification are often used to ascertain (to a certain degree) the reliability and fault tolerance of such controlling components.

Further information regarding the controlling of agricultural equipment can be found in patent applications, DE 102014211712 A1, US 2014/114478 A1, US 2014/172197 A1, EP 2821864 A1 and US 2013/147611 A1. Patent application DE 102014211712 A1 describes an arrangement for controlling a machine component of an agricultural machine using a machine control entity being wirelessly connected to a portable computer. Patent application US 2014/114478 A1 describes a system for remotely positioning an end effector. Patent application US 2014/172197 A1 describes a remote control system for controlling a vehicle with a smart phone. Patent application EP 2821864 A1 discloses a method for controlling an auxiliary function by a control element in an electronic control system of an agricultural machine based on displaying virtual control elements for controlling the auxiliary function. US 2013/147611 A1 describes a radio remote control system of a machine.

SUMMARY OF ILLUSTRATIVE EMBODIMENTS

Some simplifications may be made in the following summary, which is intended to highlight and introduce some aspects of the various exemplary embodiments, but such simplifications are not intended to limit the scope of the invention(s). Detailed descriptions of a preferred exemplary embodiment adequate to allow those of ordinary skill in the art to make and use the inventive concepts will follow in later sections.

Embodiments provide apparatuses, methods and computer programs for controlling a machine. Embodiments provide an apparatus for a mobile communication device and an apparatus for a machine control entity. The apparatus for the mobile communication device has one or more sensor modules and a control module, which determines a sensor input signal based on first and a second user input sensor data, which is based on user input. The sensor input signal may e.g. comprise the user input sensor data, and is provided to the machine control entity for processing of the user input sensor data. The machine control entity obtains the sensor input signal from the apparatus for the mobile communication device, and validates the sensor data. The validation is based on using first user input sensor data of a first sensor to validate second user input sensor data of the second sensor, e.g. by testing for a certain condition of the first input sensor data. If the validation is successful, the machine control entity controls the machine based on the sensor data.

Embodiments provide an apparatus for a mobile communication device for providing a sensor input signal to an external machine control entity to control a machine. The apparatus comprises one or more sensor modules for providing first user input sensor data and second user input sensor data. The apparatus further comprises a control module configured to determine the sensor input signal based on the first user input sensor data and the second user input sensor data. The control module is further configured to provide the sensor input signal for sensor data processing and validation to the machine control entity to control at least one of a force transmission interface (for an external component) of the machine and an engine of the machine via an interface. Providing the sensor input signal to the machine control entity enables a transfer of the processing to a module or device that can be certified to be reliable (to a point), and may enable the mobile communication device to reliably control the machine. Using different sensor data enables a mutual validation of the sensor data, and may increase a reliability of the controlling.

For example, the force transmission interface may be at least one of a mechanical force transmission interface, a power take-off, a hydraulic force transmission interface and a selective control valve. For example, the machine may be one of a vehicle, a tractor, an agricultural machine and a horticultural machine. Remote controlling such force transmission interfaces using the mobile communication device may improve a safety of the remote control of the force transmission interface.

For example, the control module may be configured to provide the sensor input signal to the machine control entity to abort a currently active functionality of the machine if the sensor input signal comprises information related to an abort gesture within the first user input sensor data from a first sensor module and within the second user input sensor data from a second sensor module. Recognizing the abort/stop gesture based on sensor data from two sensors may improve an operation safety.

In various embodiments, the control module may be further configured to obtain a sensor feedback signal from the machine control entity via the interface. The sensor feedback signal may be based on the first user input sensor data and the second user input sensor data. The sensor feedback signal may comprise information related to a validation of the second user input sensor data based on a comparison of the first user input sensor data with a validation criterion. The sensor feedback signal may be used to output, e.g. display, a result of the validation of the first and second user input sensor data, e.g. to avoid a display mismatch between locally determined sensor data and the validated sensor data used at the machine control entity.

For example, the control module may be further configured to obtain a sensor feedback signal from the machine control entity via the interface. The sensor feedback signal may be based on the second user input sensor data. The control module may be configured to provide the first user input sensor data to the machine control entity to acknowledge a correctness of the first user input sensor data as indicated by the sensor feedback signal. For example, the second user input sensor data may comprise information related to a chosen value. The first user input sensor data may comprise sensor information related to a gesture indicating an acknowledgement, that a representation of the second user input sensor data indicated by the sensor feedback signal is correct. This may enable a safer inputting of values and choosing of functionality to be controlled based on the first and the second user input sensor data.

In at least some embodiments, the control module may be configured to determine a feedback presentation signal based on the sensor feedback signal. The control module may be further configured to provide the feedback presentation signal to a feedback presentation device configured to provide feedback on the first user input sensor data and the second user input sensor data based on the feedback presentation signal. The sensor feedback signal may be used to output, e.g. display, a result of the validation of the first and second user input sensor data, e.g. to avoid a display mismatch between the locally determined sensor data and the validated sensor data used at the machine control entity.

In various embodiments, the apparatus may further comprise the feedback presentation device. The feedback presentation device may correspond to at least one element of a screen, a vibration module, a light module, an electromechanical tactile display, or a speaker. The feedback presentation device may be configured to provide at least one element of the group of audio, visual and tactile feedback. The control module may be configured to determine and provide a visual representation of the first user input sensor data and/or the second user input sensor data via the feedback presentation device. The sensor feedback signal may be used to output, e.g. display, a result of the validation of the first and second user input sensor data, e.g. to avoid a display mismatch between the locally determined sensor data and the validated sensor data used at the machine control entity.

In various embodiments, the one or more sensor modules may comprise a first sensor module configured to provide the first user input sensor data and a second sensor module configured to provide the second user input sensor data. The one or more sensor modules may comprise at least one element of the group of a touch sensor, an accelerometer, a gyroscope, and a camera sensor. Using different sensors enables a mutual validation or refinement of the sensor data, e.g. by using the second user input sensor data based on a result of the first user input sensor data.

In at least some embodiments, the first user input sensor data and/or the second user input sensor data may correspond to raw user input sensor data. Using raw sensor data may reduce a probability of failure in the mobile communication device, by deferring the processing and validation to the machine control entity.

The first user input sensor data and/or the second user input sensor data may correspond to at least one element of the group of touch screen coordinates, angular data of a gyroscope, acceleration data of an accelerometer, or imaging data of a camera sensor. Using different sensor data enables a mutual validation or refinement of the sensor data, e.g. by using the second user input sensor data based on a result of the first user input sensor data.

In various embodiments, the apparatus may further comprise the interface. The interface may correspond to a wireless communication interface for communication via a mobile communication system. The control module may be configured to wirelessly communicate with the machine control entity via the interface. A wireless communication may enhance a flexibility of a user controlling the machine.

For example, the first user input sensor data may correspond to touch screen coordinates (e.g. to a touch trajectory on a touch screen based on a plurality of touch screen coordinates). The second input sensor data may correspond to angular data of a gyroscope. The control module 16 may be configured to provide the sensor input signal to the machine control entity to control at least one of a power take-off, a valve and an engine of the machine, e.g. of a tractor.

Embodiments further provide an apparatus for a machine control entity for controlling a machine based on a sensor input signal from a mobile communication device. The apparatus comprises at least one interface for receiving the sensor input signal from the mobile communication device. The sensor input signal comprises information related to first user input sensor data and information related to second user input sensor data. The apparatus further comprises a control module configured to validate the second user input sensor data based on the first user input sensor data. The validation is based on a comparison of the first user input sensor data with at least one validation criterion. The control module is further configured to control at least one of a force transmission interface of the machine for an external component and an engine of the machine based on the first user input sensor data and the second user input sensor data after the second user input sensor data has been validated. Controlling the machine based on the first and second user input sensor data may remove a processing and validation of the sensor data from the mobile communication device, increasing a reliability of the processing. Validating the sensor data may further increase reliability and may help protect against erroneous user input and/or erroneous sensor data.

For example, the control module may be configured to abort a currently active functionality of the machine if the sensor input signal comprises information related to an abort gesture within the first user input sensor data from a first sensor module and within the second user input sensor data from a second sensor module. Recognizing the abort gesture based on (at least two) distinct sensor modules may improve a safety of the recognition based on the redundant availability of the sensor data.

For example, the sensor input signal may comprise the first user input sensor data from a first sensor module and the second user input sensor data from a second sensor module. The control module may be configured to abort a currently active functionality of the machine if the sensor input signal indicates a disruption of the first user input sensor data and/or of the second user input sensor data. Aborting the functionality upon a disruption of the sensor data may improve a safety of the remote controlling of the functionality.

In at least some embodiments the control module may be further configured to determine a sensor feedback signal based on the first user input sensor data, the second user input sensor data and the validation. The sensor feedback signal may comprise information related to a result of a validation comparison of the second user input sensor data based on the first user input sensor data. The sensor feedback signal may be used to output, e.g. display, a result of the validation of the first and second user input sensor data, e.g. to avoid a display mismatch between the locally determined sensor data and the validated sensor data used at the machine control entity.

For example, the control module may be further configured to determine a sensor feedback signal based on the second user input sensor data, and to provide the sensor feedback signal to the mobile communication device. The first user input sensor data may comprise information related to an acknowledgement to the correctness of the second user input sensor data as indicated by the sensor feedback signal. This may enable a safe inputting of values and choosing of functionality to be controlled based on the first and the second user input sensor data.

In various embodiments, the control module may be further configured to determine a plausibility of the first user input sensor data and the second user input sensor data based on a plausibility criterion. The control module may be configured to control the machine after the first user input sensor data and the second user sensor data has been determined to meet the plausibility criterion. Determining the plausibility may further increase reliability, e.g. by checking for erroneous sensor data.

In at least some embodiments, the control module may be configured to determine whether the first user input sensor data is within a range defined by the validation criterion to validate the second user input sensor data. Using a range may e.g. enable using touch screen coordinates of a gyroscope angle range to validate the sensor data.

In at least some embodiments, the first user input sensor data may correspond to touch coordinates. The control module may be configured to determine whether the touch coordinates are within one of one or more pre-defined areas within a pre-defined coordinate system. The one or more pre-defined areas may represent one or more pre-defined control actions for controlling the machine. Using the touch coordinates may enable a user of the mobile communication device to select options using a touch screen of the mobile communication device, e.g. by selecting or pressing a button, or by navigating a control to an area indicating a valid state.

In various embodiments, the control module may be configured to control the machine based on the first user input sensor data and the second user input sensor data. The control module may be configured to determine a category of the controlling based on the first user input sensor data. The control module may be configured to determine an extent of the controlling based on the second user input sensor data. Using the first user input sensor data to select a category may enable both a validation of the second user input sensor data and a refinement or specification of a usage of the second user input sensor data.

In at least some embodiments, the first user input sensor data may be based on user input related to an unlocking action. The second user input sensor data may be based on user input related to a determination of an extent of the controlling of the machine. Determining the unlocking of the controlling and the controlling itself based on different user input may enhance a reliability and/or safety of the controlling.

In at least some embodiments, the category of the controlling may correspond to at least one element of the group of a directivity of the controlling, a selection of a machine component to be controlled, a selection of a controlling sensitivity, and a selection of controlling limits. Using the first user input sensor data to select a category may enable both a validation of the second user input sensor data and a refinement or specification of a usage of the second user input sensor data.

Embodiments further provide a method for a mobile communication device for providing a sensor input signal to an external machine control entity to control a machine. The method comprises providing first user input sensor data. The method further comprises providing second user input sensor data. The method further comprises determining the sensor input signal based on the first user input sensor data and the second user input sensor data. The method further comprises providing the sensor input signal for sensor data processing and validation to the machine control entity to control at least one of a force transmission interface of the machine for an external component and an engine of the machine.

Embodiments further provide a method for a machine control entity for controlling a machine based on a sensor input signal from a mobile communication device. The method comprises receiving the sensor input signal from the mobile communication device. The sensor input signal comprises information related to first user input sensor data and information related to second user input sensor data. The method further comprises validating the second user input sensor data based on the first user input sensor data. The validation is based on a comparison of the first user input sensor data with at least one validation criterion. The method further comprises controlling at least one of a force transmission interface of the machine for an external component and an engine of the machine based on the first user input sensor data and the second user input sensor data after the second user input sensor data has been validated.

Embodiments further provide a mobile communication device comprising the apparatus for the mobile communication device. Embodiments further provide a machine control entity comprising the apparatus for a machine control entity. Embodiments further provide a machine comprising the machine control entity.

Embodiments further provide a computer program having a program code for performing the above method, when the computer program is executed on a computer, a processor, or a programmable hardware component. A further embodiment is a computer readable storage medium storing instructions which, when executed by a computer, processor, or programmable hardware component, cause the computer to implement one of the methods described herein.

BRIEF DESCRIPTION OF THE FIGURES

Some other features or aspects will be described using the following non-limiting embodiments of apparatuses or methods or computer programs or computer program products by way of example only, and with reference to the accompanying figures, in which.

DESCRIPTION OF EMBODIMENTS

Figure 1A:
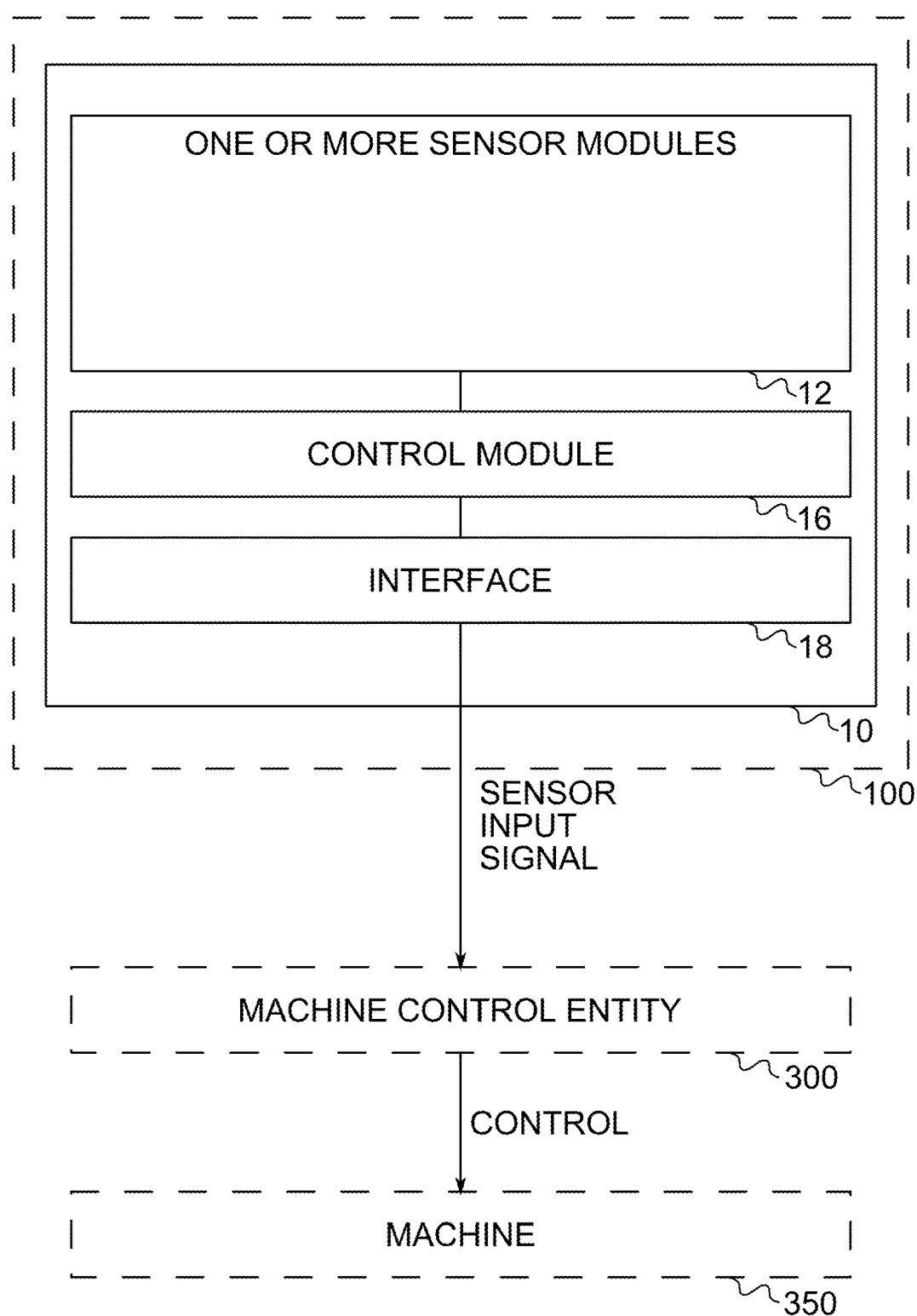
FIG. 1a illustrates a block diagram of an embodiment of an apparatus for a mobile communication device for providing a sensor input signal to a machine control entity to control a machine.

Various example embodiments will now be described more fully with reference to the accompanying drawings in which some example embodiments are illustrated. In the figures, the thicknesses of lines, layers or regions may be exaggerated for clarity. Optional components are illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

In conventional systems, smart phones might not be used for controlling safety-relevant applications. At least some embodiments may provide a functional security concept for using a mobile communication device (e.g. a smartphone) for controlling safety-critical functionality of a machine.

In an exemplary embodiment, a smartphone is paired to a machine control entity. The connection is secured, but unreliable. The smartphone is assumed to be unsafe and unsecure. Embodiments may reduce or avoid unacceptable risks during controlling.

Embodiments may mitigate the relevant sources of danger and reduce an inherent risk of the application to an acceptable amount. Embodiments may be based on core aspects:
 Reducing the application logic of an apparatus for a smartphone
  Relevant application logic may be deferred to a machine control entity
  The machine control entity may validate the actions of the smartphone
 Sequence Monitoring may be used to check the user activity for plausibility
 The information displayed on the smartphone may be controlled by the machine control entity
 The smart phone sensor data and user interaction may be tested for plausibility on the machine control device
  Test plausibility using algorithms
  Provide feedback loop, e.g. using vibration
 Redundant usage of sensor data (first and second user input sensor data)
  Exemplary sensors: touchscreen, gyroscope, acceleration sensor, camera, volume control, power switch, GPS, microphone etc.
 Usage concept (may e.g. also be used for one-handed usage, may lead to adequate ergonomics. A user may look at the hitch without being distracted by using the application. A usage concept may also be similar to a television remote control: A user may extend the smartphone from the body during the usage. A user may further obtain feedback (visual/tactile).

In an exemplary embodiment, a mobile communication device may be used to control a hitch of a tractor using an app. Other embodiments may be a remote control of a force transmission interface and/or of an engine of a machine. At least some embodiments may be based on ascertaining, that failures or errors do not cause bodily harm to the user or other people. At least some embodiments may be based on the finding, that controlling a reliability of a smartphone app is not trivial, as smartphones are complex systems, and an analysis of the operating system and hardware may not be feasible due to the complexity and an unavailability of the source code and hardware schematics. At least some embodiments may enable a safe remote control of a hitch, a power take-off (PTO), a valve (e.g. a selective control valve) and/or an engine of a tractor using a smartphone application. Embodiments may enable a remote control of these elements without putting humans at risk. A technical problem in some embodiments may be to implement such a remote control on a smartphone, which may be, especially in a safety context, a black box, which may be closed to software and hardware analysis, and which may be closed for additional measures taken to ensure an improved safety.

Using smartphones in safety-critical applications is widely regarded as unfeasible. A smartphone often cannot provide the necessary reliability for safety-critical applications. An additional safety concept may protect against untrusted consumer electronics and unreliable communication channels. At least some embodiments may provide a functional safety concept for using a (per-se) unsafe mobile device (e.g. a smartphone) for controlling safety-critical functions. Embodiments may provide a safety concept for commanding a hitch (or a PTO, a valve or an engine) of a tractor via smartphone in stationary automation.

Embodiments may be based on taking the smartphone and wireless communication "out of the critical path". Embodiments might not implement the application logic on the "unreliable" smartphone, but on a "reliable" machine control entity. In turn, the smartphone might be used as a display and a set of sensors. Embodiments may further provide validated information for the display of the smartphone. Embodiments may detect and mitigate erroneous sensor data, and may reduce an accidental usage of the remote control. Embodiments may further enable that system behavior does not exhibit unacceptable risks.

The system may behave as specified/intended, and deviations may be sufficiently unlikely in relation to associated risks. Embodiments may provide that (some of) the conceivable hazardous user behavior/misuses etc. (e.g. smartphone in pocket) are also safeguarded. Embodiments may further support an application of ISO 25119 and ISO 12100 for mechanical hazards, e.g. a deviation between actual and intended hitch movement.

Failures are one exemplary cause of hazards. "The operator intends to move one hitch (or to start one Power Take-Off, PTO) but the other hitch moves" is one exemplary hazard cause by failure. Those failures may e.g. stem from usability issues, e.g. unclear hitch selection view, or behavior issues, such as hitch view mix-up, or security issues, where an attacker flips front hitch selection button (or a front PTO selection button) pressed to rear hitch button (rear PTO button) pressed or vice versa. Things that can go wrong in use cases may be failure sequences or failure combinations, e.g. the hitch (or PTO) may start moving even though the operator moves neither the slider nor tilts the smartphone. Somebody may be injured due to commission of starting the movement. The movement may start even though the slider is not moved to an end position, or the smartphone is not in the tilt position. The hitch (or PTO) may move faster than intended by the operator (movement of hitch per unit of time is higher than expected).

Safety measures may be taken for achieving safety goals. A safety goal can be supported by several measures. For example, an exemplary safety goal is: The overall system shall only move the front hitch (or front PTO, or wrong valve) if a front hitch movement is intended, and it shall only move the rear hitch (rear PTO, or wrong valve) if a rear hitch movement is intended.

There are be a number of different causes for such failures that at least some embodiments may be safeguarding against during the design of a system:
Unclear hitch (or PTO, valve) selection view (usability)
The design of the hitch (or PTO, valve) selection view should be unambiguous with respect to a hitch mix-up, e.g. t system may show the "move front hitch view" if the front hitch was selected in the "hitch selection view".
Thin client concept: app forwards raw sensor data from mobile communication device
Sequence monitoring: machine control entity checks sequences of events
View validation: gateway tells the app which view it should show and checks if this view is actually shown
"Front hitch button pressed" event instead of "Rear hitch button pressed" event is signaled to the machine control entity (or vice versa, similar for PTO or valves)
May happen due to scheduling/race conditions in non-real time systems
Securing/Validating/Check for plausibility the received sensor data At least some embodiments may be based on pairing (exactly) one mobile communication device and one machine control entity. The connection may be secure (e.g. through encryption), but might not be reliable. The smartphone might be neither safe nor secure. At least some embodiments may be based on reducing the application logic of the smartphone application (to a minimum), plausabilizing/validating the sensor data and the user interaction (e.g. in the machine control entity) and redundant usage of sensors (two or more sensors).

At least some embodiments may enable a reduction or exclusion of unacceptable risks in connection with the application. At least some safety concepts for a remote control of a tractor hitch may be used for controlling a PTO, an SCV and an engine.

FIG. 1a illustrates a block diagram of an embodiment of an apparatus 10 for a mobile communication device 100 for providing a sensor input signal to an external machine control entity 300 to control a machine 350. In embodiments, the external machine control entity is a machine control entity 300 being external to/outside the mobile communication device 100.

In various embodiments, the mobile communication device 100 may e.g. correspond to a mobile phone, a programmable mobile phone, a smartphone, a tablet computer, a slate computer, a laptop computer, a mobile computing device, or a personal digital assistant. For example, the machine 350 may be one of a vehicle, a tractor, an agricultural machine and a horticultural machine. The machine 350 may e.g. correspond to an agricultural machine, an industrial machine, a machine for a heavy industry, a vehicle, a transportation machine, a tractor, a hoist, a hydraulic lift, a manlift, an articulated arm, or an extension ladder. The machine 350 may also correspond to a sub-unit of a machine, e.g. a hitch of a tractor, or an articulated arm of an industrial robot. In embodiments the machine control entity 300 may be implemented using one or more processing units, one or more processing devices, any means for processing, such as a processor, a computer or a programmable hardware component being operable with accordingly adapted software. In other words, the described function of the machine control entity 300 may as well be implemented in software, which is then executed on one or more programmable hardware components. Such hardware components may comprise a general purpose processor, a Digital Signal Processor (DSP), a micro-controller, etc. The machine control entity 300 may e.g. be situated with the machine 350, e.g. be comprised in the machine's electronics, or may be located in a communication network and act as a relay, gateway or interpreter between the mobile communication device 100 and the machine 350. In at least some embodiments, the machine control entity 300 may be configured to control one machine, e.g. multiple components of one machine, or the machine control entity 300 may be configured to control a plurality of machines, e.g. a plurality of components of a plurality of machines.

Figure 1B:
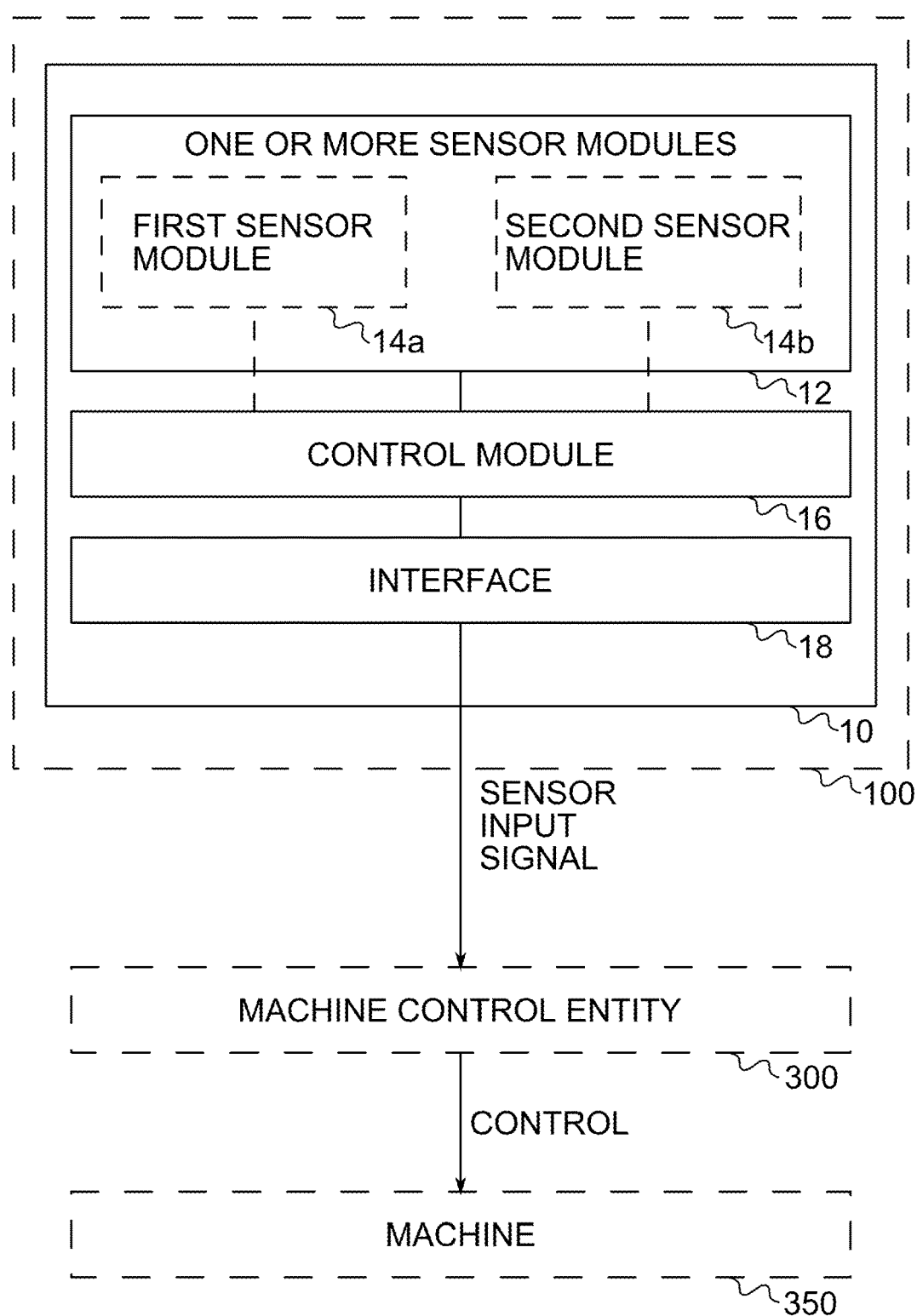
FIG. 1b illustrates a block diagram of a further embodiment of the apparatus, further comprising a first and a second sensor module.

The apparatus 10 comprises one or more sensor modules 12 to provide first user input sensor data and second user input sensor data. In at least some embodiments, the one or more sensor modules 12 may comprise a first sensor module 14a configured to provide first user input sensor data and a second sensor module 14b configured to provide second user input sensor data. FIG. 1b additionally shows the first and second sensor modules 14a; 14b. In various embodiments, the one or more sensor modules 12 (and the first and second sensor modules 14a; 14b) may e.g. comprise at least one element of the group of a touch sensor, an accelerometer, a gyroscope, a camera sensor, an acoustic sensor, a time of flight sensor, or a pressure sensor. The first user input sensor data and/or the second user input sensor data may correspond to at least one element of the group of touch screen coordinates, angular data of a gyroscope, acceleration data of an accelerometer, imaging data of a camera sensor, acoustic data, time of flight data, distance information, or pressure data. In various embodiments, the first user input sensor data may be based on user input related to an unlocking action. The unlocking action may e.g. correspond to moving a display element to a target position, pushing a button, bringing the mobile communication device in an angular position, or pressing a touchscreen, e.g. at predefined coordinates. The second user input sensor data may be based on user input related to a determination of an extent of the controlling of the machine. The user input related to the determination of the extent of the controlling of the machine may e.g. correspond to changing an angle of the mobile communication device, moving a display element, e.g. a slider user interface element, pushing a button, changing a displayed value, or changing an acceleration or direction of a movement of the mobile communication device.

In at least some embodiments, the first user input sensor data and/or the second user input sensor data corresponds may correspond to raw user input sensor data. The first user input sensor data and/or the second user input may e.g. correspond to sensor data as obtained from sensor modules, which may e.g. be preprocessed, e.g. touch coordinates derived from electric currents and capacitances.

The apparatus 10 further comprises a control module 16 configured to control the one or more sensor modules 12, e.g. the first sensor module 14a and the second sensor module 14b. The control module 16 is configured to determine the sensor input signal based on the first user input sensor data and the second user input sensor data.

The control module 16 is further configured to provide the sensor input signal for sensor data processing and validation to the machine control entity to control at least one of a force transmission interface of the machine 350 for an external component and an engine of the machine 350 via an interface 18. The control module 16 may be configured to determine the sensor input signal by encapsulating the first and second user input sensor data. The control module 16 may e.g. be configured to determine the sensor input signal based on the first and second user input sensor data without altering the first and second user input sensor data. The control module 16 may e.g. be configured to determine the sensor input signal by forwarding the first and second user input sensor data. The control module 16 may e.g. be configured to continuously forward information related to the first user input sensor data and the second user input sensor data using the sensor input signal to the machine control entity. The control module 16 may e.g. be configured to perform pre-processing of the first and second user input sensor data by converting physical properties of components, signals, currents or voltages into digital data, e.g. capacitances into touch screen coordinates, output of a gyroscope into angular data, e.g. without performing additional processing.

For example, the force transmission interface may be at least one of a mechanical force transmission interface, a power take-off (PTO), a hydraulic force transmission interface and a selective control valve (SCV).

For example, the first user input sensor data may correspond to touch screen coordinates or to a touch trajectory on a touch screen based on a plurality of touch screen coordinates. The second input sensor data may correspond to angular data of a gyroscope. The control module 16 may be configured to provide the sensor input signal to the machine control entity 300 to control at least one of a power take-off, a valve and an engine of the machine 350. For example, the first user input sensor data may comprise information related to a gesture performed, e.g. a circle drawn or a key drawn. For example, the first user input sensor data may comprise information related to a (touch screen) slider moved, e.g. upwards or downwards. For example the second user input sensor data may comprise information related to the mobile communication device being tilted to acknowledge a previously drawn action. For example, the second user input sensor data may comprise information related to pointing the mobile communication device towards a part of the machine 350 to be controlled, e.g. towards a front PTO or towards a back PTO.

In at least some embodiments, the apparatus may further comprise the interface 18. The interface 18 may e.g. correspond to a wireless communication interface for communication via a mobile communication system. The control module 16 may be configured to wirelessly communicate with the machine control entity 300 via the interface 18. The interface 18 may e.g. correspond to a Wireless Local Area Network (WLAN) interface, or it may correspond to an interface for communicating with a cellular mobile communications system, e.g. Universal Mobile Telecommunication System (UMTS), a Long Term Evolution (LTE) mobile communication system, or a cellular mobile communication system of the $5^{th}$ Generation (5G). The interface 18 may correspond to one or more inputs and/or outputs for receiving and/or transmitting information, which may be in digital (bit) values according to a specified code, within a module, between modules or between modules of different entities. In an exemplary embodiment, the interface 18 may be configured to wirelessly communicate with an interface of the machine control entity, e.g. at least one interface 32 as introduced subsequently. The wireless communication and/or a communication of the at least one interface 32 with a control module 34 of the machine control entity as introduced subsequently may e.g. be based on the International Standardization Organization (ISO) standard 11783.

For example, the control module 16 may be configured to provide the sensor input signal to the machine control entity 300 to abort a currently active functionality of the machine 350 if the sensor input signal comprises information related to an abort gesture within the first user input sensor data from a first sensor module 14a and within the second user input sensor data from a second sensor module 14b. For example, the abort gesture may be an open hand (holding the mobile communication device) pointed towards the machine 350. For example, the abort gesture may be registered by both the first sensor module 14a and the second sensor module 14b (e.g. for redundancy). For example, the abort gesture may be an abort-all gesture, or the system may support an abort gesture (stop gesture) and an abort all gesture (stop all gesture). For example, the abort all gesture might be used in all screens of a mobile application implementing the control module 16.

In various embodiments, the control module 16 may be further configured to obtain a sensor feedback signal from the machine control entity 300 via the interface 18. The sensor feedback signal may be based on the first user input sensor data and the second user input sensor data. In at least some embodiments, the sensor feedback signal may comprise information related to processed versions of the first and/or second user input sensor data, e.g. validated, interpolated versions or versions checked for plausibility of the first and/or second user input sensor data. In various embodiments, the sensor feedback signal may comprise a visual representation of the first and/or second user input sensor data, e.g. as values, as picture data, or as visual interface instruction data. The sensor feedback signal may comprise information related to a validation of the second user input sensor data based on a comparison of the first user input sensor data with a validation criterion. The information related to the validation may correspond to a version of the of the first and/or second user input sensor data that has been validated, a binary representation indicating a validation, a delta between validated user input sensor data and the user input sensor data of the one or more sensor modules 12 and/or processed versions of the first and/or second user input sensor data.

For example, the sensor feedback signal may be based on the second user input sensor data. For example, the control module 16 may be configured to output a representation of the sensor feedback using a feedback presentation device 20. For example, the second user input sensor data may comprise information related to a chosen value (e.g. a chosen numerical value or a chosen functionality of the machine). For example, the chosen value may be chosen based on a touch screen, e.g. based on selecting one of a plurality of options or by selecting a value on a slider. The control module 16 may be configured to provide the first user input sensor data to the machine control entity 300 to acknowledge a correctness of the first user input sensor data as indicated by the sensor feedback signal. For example, the first user input sensor data may comprise information related to a drawn acknowledgement gesture (e.g. a drawn checkmark) acknowledging the correctness of the first user input sensor data as indicated by the sensor feedback signal. For example, the first user input sensor data may comprise sensor information related to a gesture indicating an acknowledgement, that a representation of the second user input sensor data indicated by the sensor feedback signal is correct. For example, the first user input sensor data may be provided after the representation of the sensor feedback has been output.

At least some embodiments may enable a safe manipulation/setting of parameters. In at least some cases, a range of possible values of such parameters may be so large, that not every value might be displayed as distinct and distinguishable trajectory on the smartphone screen, that may be traced by the user. In case of manipulating the direction of movement of a hitch was chosen by moving a vertical slider on the smartphone screen upwards or downwards. The raw sensor data of the slider/finger movement may be validated/ plausibilized in the gateway (the machine control entity) of the tractor. For plausibilization, it may be necessary, to assign each parameter (hitch up! hitch down!) a distinct and distinguishable trajectory (slider up! slider down!). This might not be possible, if the range of possible values (e.g. when manipulating a number of revolutions of an engine) is very large. At least some embodiments may be based on choosing a value using an arbitrary technique (e.g. using a scrollbar) on the smartphone. The value (or raw sensor data thereof) may be transmitted to the gateway. The value received there may be transposed into a different representation (e.g. transforming an integer value into an image. The transformed/transposed value may be transmitted to the smartphone and shown there. The user may acknowledge a validity of the value using a pre-defined trajectory (e.g. by tracing a checkmark).

At least some embodiments may extend the safe remote control from a single functionality to multiple functionalities. The extension may take into account two safety-relevant aspects: 1) an accidental remote control of the wrong functionality and 2) the safety concept of one functionality may negatively influence the safety concept of another functionality.

At least some embodiments may relate to a remote control of a functionality and may address these two issues, as choosing the functionality for remote control may be implemented similar to choosing a hitch (e.g. a front or a back hitch), for which such considerations may be made to harmonize the safety concepts.

In at least some embodiments, the control module 16 may be configured to determine a feedback presentation signal based on the sensor feedback signal. The feedback presentation signal may e.g. be based on a visual, tactile, audio, or signal representation of sensor data comprised in the sensor feedback signal. As shown additionally in FIG. 1c, the control module 16 may be further configured to provide the feedback presentation signal to a feedback presentation device 20 configured to provide feedback on the first user input sensor data and the second user input sensor data based on the feedback presentation signal. The control module 16 may e.g. be configured to determine and provide a visual representation of the first user input sensor data and/or the second user input sensor data via the feedback presentation device 20. In at least some embodiments, the apparatus may further comprise the feedback presentation device 20. The feedback presentation device may e.g. correspond to at least one element of a screen, a vibration module, a light module, an electromechanical tactile display, or a speaker. The feedback presentation device 20 may e.g. be configured to provide at least one element of the group of audio, visual and tactile feedback. The control module 16 may e.g. be configured to inform a user of the mobile communication device of a progress of the controlling using tactile, e.g. vibration, feedback, e.g. by indicating a start or progress of the controlling using vibrations.

The control module 16 is coupled to the one or more sensor modules 12, e.g. the first and second sensor modules 14a; 14b. The control module 16 is further coupled to the optional interface 18. The control module 16 is further coupled to the optional feedback presentation device 20.

Figure 2:
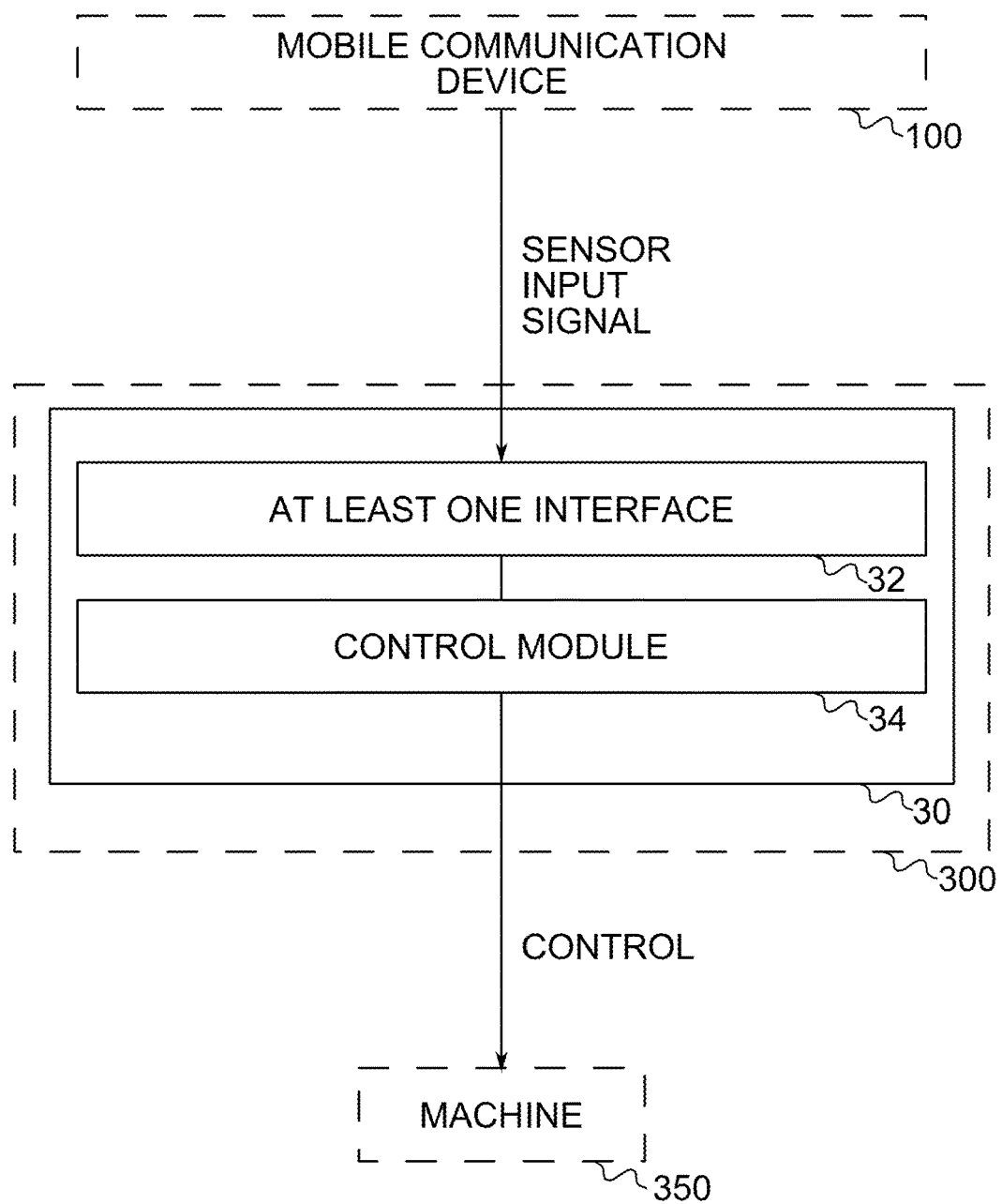
FIG. 2 illustrates a block diagram of an embodiment of an apparatus for a machine control entity for controlling a machine based on a sensor input signal from a mobile communication device.

FIG. 2 illustrates a block diagram of an embodiment of an apparatus 30 for a machine control entity 300 for controlling a machine 350 based on a sensor input signal from a mobile communication device 100. The apparatus 30 comprises at least one interface 32 for receiving the sensor input signal from the mobile communication device 100. The sensor input signal comprises information related to first user input sensor data and information related to second user input sensor data. In at least some embodiments, the first user input sensor data may be provided by a first sensor module 14a, and the second user input sensor data may be provided by a second sensor module 14b. The information related to the first user input sensor data may comprise the first user input sensor data or a pre-processed version of the first user input sensor data, e.g. digital values based on physical properties of an output of the first sensor module. The information related to the second user input sensor data may comprise the second user input sensor data or a pre-processed version of the second user input sensor data, e.g. digital values based on physical properties of an output of the second sensor module.

The at least one interface 32 may correspond to one or more inputs and/or outputs for receiving and/or transmitting information, which may be in digital (bit) values according to a specified code, within a module, between modules or between modules of different entities. In at least some embodiments, the at least one interface 32 may correspond to a wireless communication interface. The apparatus 30 may be configured to wirelessly communicate with the mobile communication device 100.

The apparatus 30 further comprises a control module 34 configured to validate the second user input sensor data based on the first user input sensor data. Alternatively or additionally, the control module 34 may be configured to validate the first user input sensor data based on the second user input sensor data. The validation is based on a comparison of the first user input sensor data with at least one validation criterion. The control module 34 may e.g. be configured to validate the second user input sensor data based on the first user input sensor data indicating a user input correspond to an unlocking of the controlling. The validation criterion may e.g. correspond to pre-defined user input. The pre-defined user input may e.g. correspond to at least one element of the group of a range of touch-screen coordinates indicating an activation or unlocking of the controlling, a directivity of touch screen input indicating an unlocking or activation of the controlling, a lower angle indicating an unlocking or activation of the controlling, an upper angle indicating a locking/deactivation of the controlling, a reference image for comparison with camera sensor data indicating a machine or component of the machine to be controlled, or a directivity/location for comparison with angular or location data, indicating a machine or component of the machine to be controlled. In various embodiments, the control module 34 may be configured to determine whether the first user input sensor data is within a range defined by the validation criterion to validate the second user input sensor data. The first user input sensor data may e.g. correspond to touch coordinates. The control module 34 may be configured to determine whether the touch coordinates are within one of one or more pre-defined areas within a pre-defined coordinate system. The one or more pre-defined areas may e.g. represent one or more pre-defined control actions for controlling the machine 350. The pre-defined areas may e.g. be represented by buttons, fields or sliders, e.g. indicating an activation/unlocking of the controlling.

The control module 34 is further configured to control at least one of a force transmission interface of the machine 350 for an external component and an engine of the machine 350 based on the first user input sensor data and the second user input sensor data after the second user input sensor data has been validated. In various embodiments, the control module 34 may be configured to control at least one of a force transmission interface of the machine 350 for an external component and an engine of the machine 350 based on the first user input sensor data and the second user input sensor data. The control module 34 may be configured to determine a category of the controlling based on the first user input sensor data. The control module 34 may be configured to determine an extent of the controlling based on the second user input sensor data. The category of the controlling may e.g. correspond to at least one element of the group of a directivity of the controlling, a selection of a machine component or functionality of the machine 350 (e.g. the force transmission interface, the PTO, the valve, the SCV, the engine), to be controlled, a selection of a controlling sensitivity, and a selection of controlling limits. The control module 34 may e.g. be configured to transform the second and/or first user input sensor data into machine control information, e.g. touch screen coordinates indicating a touch screen gesture into a machine component to be controlled, touch screen coordinates into a directivity, angular data into a velocity of a movement, angular data into a directivity etc. For example, touch screen coordinates indicating a touch screen gesture may be at least one of a key shaped gesture for starting the engine, a circular shaped gesture for starting the PTO, a horizontal sliding gesture for starting the SCV, an acknowledgement gesture an open hand stop gesture, and a shaking stop all gesture.

For example, the control module 34 may be configured to transform the second user input sensor data into a value (e.g. the chosen value) or into a function to be performed, and to transform the first user input sensor data to recognize information related to an acknowledgement of the value or function to be performed. For example, the control module 34 may validate the value or function to be performed based on the recognized information related to the acknowledgement.

In embodiments the control module 34, and/or the control module 16 introduced previously, may be implemented using one or more processing units, one or more processing devices, any means for processing, such as a processor, a computer or a programmable hardware component being operable with accordingly adapted software. In other words, the described function of the control modules 16; 34 may as well be implemented in software, which is then executed on one or more programmable hardware components. Such hardware components may comprise a general purpose processor, a Digital Signal Processor (DSP), a micro-controller, etc. In at least some embodiments, the control modules 16 may be comprised in a program for a mobile communication device, e.g. an app.

In at least some embodiments, the control module 34 may be further configured to determine a sensor feedback signal based on the first user input sensor data, the second user input sensor data and the validation. The sensor feedback signal may comprise information related to a result of a validation comparison of the second user input sensor data based on the first user input sensor data. In at least some embodiments, the control module 34 may be configured to determine the sensor feedback signal to comprise information related to validated versions of the first and second user input sensor data, e.g. first and second user input sensor data user to control the machine 350. In various embodiments, the control module 34 may be further configured to determine the sensor feedback signal based on versions of the first and/or second user input feedback signal checked for plausibility as described subsequently. In various embodiments, the control module 34 may be further configured to determine information related to a representation of the first and/or second user input sensor data for the sensor feedback signal, e.g. for output using the feedback presentation device 20.

For example, the control module 34 may be further configured to determine the sensor feedback signal based on (only) the second user input sensor data. For example, the first user input sensor data comprises information related to an acknowledgement to the correctness of the second user input sensor data as indicated by the sensor feedback signal. For example the control module 34 may be configured to control the machine 350 based on the second user input sensor data if the first user input sensor data indicates that the feedback signal for the second user input sensor signal was correct (e.g. that it showed a correctly chosen value). For example, the second user input sensor data may comprise information related to a chosen value and the first user input sensor data may comprise sensor information related to a gesture indicating an acknowledgement, that a representation of the second user input sensor data indicated by the sensor feedback signal is correct. If the first user input sensor data comprises the information related to the gesture indicating the acknowledgement (e.g. a drawn checkmark), the control module 34 may be configured to control the machine 350 based on the information related to the chosen value. For example, the information related to the chosen value may be a digital value, e.g. non-sensor data.

In various embodiments, the control module 34 may be further configured to determine a plausibility of the first user input sensor data and the second user input sensor data based on a plausibility criterion. The control module 34 may be configured to control the machine 350 after the first user input sensor data and the second user sensor data has been determined to meet the plausibility criterion. In various embodiments, the plausibility criterion may correspond to at least one element of the group of a lower threshold, an upper threshold, a lower angular threshold, an upper angular threshold, a delta between successive sensor data, or a sequence of sensor data.

For example, the control module 34 may be configured to abort a currently active functionality of the machine 350 if the sensor input signal comprises information related to an abort gesture within the first user input sensor data from a first sensor module and within the second user input sensor data from a second sensor module. For example, the control module 34 may be configured to abort the currently active functionality if at least one of the first user input sensor data and the second user input sensor data comprises the information related to the abort gesture. Alternatively, the control module 34 may be configured to abort the currently active functionality if both the first user input sensor data and the second user input sensor data comprises the information related to the abort gesture. For example, the control module 34 may be configured to abort all of the currently active functionality of the machine 350 based on the information related to the abort gesture. For example, the abort gesture may be an activity-independent abort gesture or an abort-all gesture. Alternatively, the abort gesture may be related to a functionality or machine part of the machine 350 currently chosen by the mobile communication device. For example, the functionality of the machine 350 may be a turning of a force transmission interface, e.g. a PTO. For example, the functionality of the machine 350 may be a running of an engine of the machine.

In at least some embodiments, the control module 34 may be configured to stall a controlling of the machine 350 if the sensor input signal is missing at least part of a transmission of sensor data or if the plausibility check determines the user input sensor data to be implausible. In various embodiments, the control module 34 may be configured to signal the stalling as part of the sensor feedback signal to the mobile communication device 100. For example, the control module 34 may be configured to abort a currently active functionality of the machine 350 if the sensor input signal indicates a disruption of the first user input sensor data and/or of the second user input sensor data. For example, the sensor input signal may indicate a disruption of the first user input sensor data and/or of the second user input sensor data if packets comprising the first user input sensor data and/or of the second user input sensor data cease to arrive, or if a timestamp of data packets comprising the first user input sensor data and/or of the second user input sensor data are below a timestamp threshold. For example, the sensor input signal may indicate a disruption of the first user input sensor data and/or of the second user input sensor data if the first user input sensor data and/or of the second user input sensor data seem to be/are stuck at a value.

In some systems, a permanent action (e.g. a continuous movement on a vertical slider on the smartphone screen and holding the smartphone in a pre-defined postion) may be required or keep the currently active functionality active. As soon as one of the pre-conditions is not met, the active functionality (e.g. moving the hitch of the tractor) may be stopped). With other functionalities (e.g. PTO, SCV, engine), this concept might not be applicable, as the user might require both hands for other activities. At least some embodiments may be based on an abort/stop gesture (e.g. a hand movement of a hand holding the smartphone). The gesture might be chosen such, that it stimulates multiple sensors such, that the gesture may be recognized using one of the sensors. Additionally, the sensors may be chosen such that they continuously provide values, so a detection, of whether the sensor works, may be possible. The execution of the stop/abort gesture may affect a stop of an actions displayed by the smartphone. If the user wants to stop an action currently not being displayed, he might be required to navigate to that function. As some errors, such as a freezing of a screen may make a navigation impossible, the abort/stop gesture may be extended. If the user, after performing the abort/stop gesture, shakes his hand, all currently active functionality may be stopped.

Embodiments may provide a concept for safely stopping a currently active functionality of the machine. The functionality might be started once and may remain active until it is aborted/stopped by a user. The user might not be required to permanently perform an action, to keep the functionality active.

In at least some embodiments, the control module 34 may be configured to communicate in an encrypted format using the at least one interface 32, e.g. using encryption built into a communication protocol, e.g. WLAN encryption, or using application level encryption, e.g. to safeguard against an alteration of sensor data due to incursion of an attacker.

In various embodiments, the control module 34 may be further configured to establish a pairing with the mobile communication device 100. The control module 34 may e.g. be configured to accept the sensor input signal from devices paired with the machine control entity. In at least some embodiments, the pairing may be based on a hardware address of the mobile communication device and/or the machine control entity, and/or the control module 34 may be configured to establish a pairing based on an encryption using a combined master key based on a key exchange algorithm. The control module 16 may be configured to establish the pairing in conjunction with the control module 34.

At least some embodiments may be based on a "thin client" concept. The control module 34 may be configured to process the user input sensor data supplied by the mobile communication device 100, and the control module 16 may be configured to provide or forward the (first and second) user input sensor data, obtain the sensor feedback signal, and present the feedback using the presentation device 20.

In at least some embodiments, the control module 34 and/or the control module 16 may be configured to add further security and redundancy measures to communication. The control module 34 and/or the control module 16 may e.g. be configured to communicate using sequence monitoring, e.g. using a persistent index to establish an order of transmitted sensor data, feedback, and/or redundancy data, which may be user to identify missing parts of the communication. The control module 34 and/or the control module 16 may further be configured to use a Cyclic Redundancy Check (CRC) to secure messages, e.g. to allow a recovery of lost or corrupted transmissions. The control module 34 and/or the control module 16 may further provide watchdog functionality to identify failed communication or transmissions.

In at least some embodiments, the control module 34 may be configured to provide the sensor feedback signal to the mobile communication device 100, and the sensor feedback signal may be used to output a representation of the sensor feedback signal using the feedback presentation device 20. The control module 16 may be further configured to provide feedback representation feedback to acknowledge an outputting of the sensor data. The feedback representation feedback may comprise values outputted by the feedback presentation device 20. The control module 34 may be configured to check a match of the outputted values and the transmitted sensor feedback signal.

In various embodiments, the control module 34 and/or the control module 16 may be configured to add a time-stamp when communicating, e.g. to identify an order within the communication, and/or to identify delays or a plausibility of sensor data (missing sensor data).

Figure 1C:
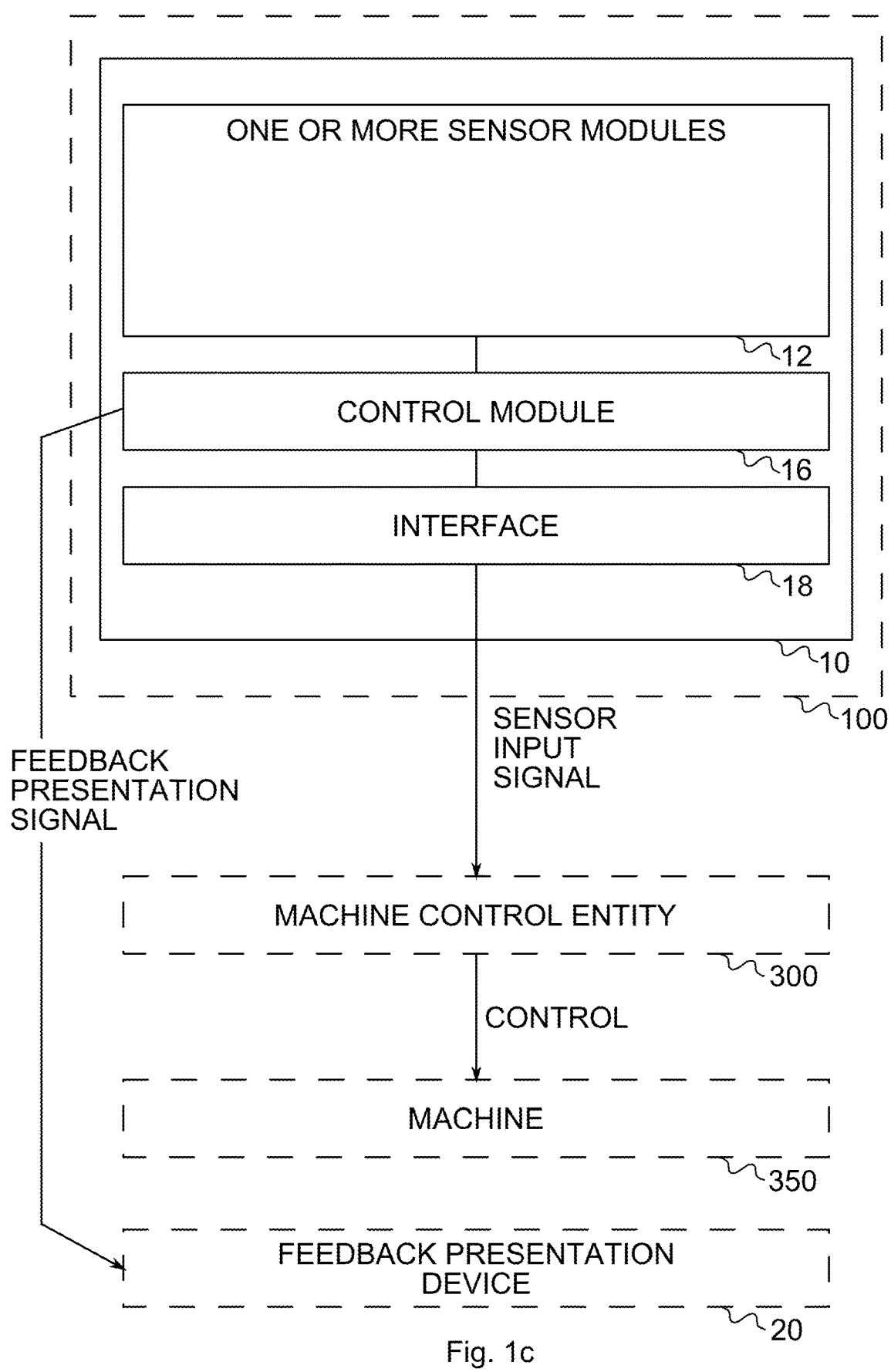
FIG. 1c illustrates a block diagram of a further embodiment of the apparatus further showing a feedback presentation device.

More details and aspects of the semiconductor apparatus 30 (e.g. machine 350, mobile communication device 100, machine control entity 300, sensor input signal, first user input sensor data, second user input sensor data, first sensor module, second sensor module, sensor feedback signal) are mentioned in connection with the proposed concept or one or more examples described above (e.g. FIGS. 1a-1c). The apparatus 30 may comprise one or more additional optional features corresponding to one or more aspects of the proposed concept or one or more examples described above or below.

At least some embodiments may extend the scope of other systems with respect to the following functions:
PTO: Remote control of both the front and the rear PTO may be enabled in terms of PTO engagement and disengagement. In addition, for the rear PTO, the gear may be selected before engagement.
SCV: Remote control of the SCVs in the front and rear of the tractor. For (all) SCVs, remote engagement in retract and extend direction and remote disengagement may be enabled.
Engine: Remote control of the engine may be enabled in terms of turning the engine on and off and selecting a revolutions per minute (RPM) value.

Some aspects may be reused from other systems. However, two major differences were discovered:
Selection from a large range of values
No continuous user input while function is active The first point refers to the selection of a specific value from a range of possible values. In the some systems for controlling a hitch, the (only) two choices may be to select one hitch from two possible hitches and to choose one direction from two possible directions. For example, the engine RPM that may be selected from a large range of values. This may lead to the new confirmation concept.

For example, the existing HMI (Human Machine Interaction) of embodiments may be improved. For instance, it may be abstracted from the engine because the engine is (only) controlled in order to control PTO and SCV. Changing the existing HMI may be risky as the user may be used to the existing HMI and a new HMI might cause user errors. Furthermore, the realization of an improved HMI generally means that some tasks are performed by the system that were previously performed by the user. This may increase the complexity and responsibility of the system. The HMI may be maintained as far as possible. Valid arguments for changing the HMI are safety arguments and feasibility arguments (e.g. impossible to achieve with the current ISOBUS-spec (International Standardization Organization Standard 11783, Tractors and machinery for agriculture and forestry—Serial control and communications data network)).

Not (all) control features of the existing HMI for engine, PTO, SCV might be implemented on the mobile communication device. Control features implemented may be:
Start engine, Stop engine, Set engine RPM
Select [front rear] PTO, Select [N, 540, 540E, 1000] rear PTO gear, Start PTO, Stop PTO
Select ($1^{st}$, $2^{nd}$, $3^{rd}$, . . . ) SCV, Extend SCV, Retract SCV, Stop SCV
Hitch [front rear], Hitch up, Hitch down, Stop Hitch Below, safety concepts according to at least some embodiments are introduced. Concepts (and/or parts thereof) may be used and/or combined in at least some embodiments.

The Pairing Concept may safeguard against the hazard "Wrong tractor". If the user of the system wants to remote-control a tractor, he first sends a request for connection to this tractor. On the Virtual Terminal inside this tractor's cabin, a sufficiently long pairing code, which contains a randomly generated part, may then be shown. The user may visit the tractor and enter the paring code into his smartphone. Afterwards he can remote-control the tractor's functions for this session. This concept reduces the freedom of the user as he may visit the tractor to be controlled at least once.

The Feedback Concept is one of the select value concepts (SVC). The Feedback Concept may safeguard against the hazard "Wrong function setting". After the user has selected a setting, the gateway clearly displays the received setting on the subsequent view. This concept may require a subsequent view and may therefore not be suited for choosing a setting that directly influences a currently running function, e.g. changing the RPM of a running engine.

The Screen Trajectory Concept is one of the select value concepts (SVC). The Screen Trajectory Concept may safeguard against the hazard "Wrong function setting". The user may be giving an entire screen trajectory that represents a specific function setting, e.g. slider up for hitch up. As the number of meaningful and unambiguously detectable screen trajectories may be limited, the number of settings that may be protected with this concept may be also limited.

The Confirmation Concept is one of the select value concepts (SVC). The Confirmation Concept may safeguard against the hazard "Wrong function setting". It may be a combination of the Feedback Concept and the Screen Trajectory Concept. The user selects a setting and the gateway echoes the received setting to the smartphone. The user then may confirm this setting with a common screen trajectory. This concept may require the user to perform this additional confirmation step and may therefore (only) be used where necessary. However, it may be able to protect function settings of actively running functions across a wide range of possible values.

The Timestamp Concept may safeguard against the failure that the OS is sending outdated data to the gateway. The gateway regularly provides the smartphone with timestamps that may be used to sign (all) packages from the smartphone with the timestamp. This way the gateway may notice when it receives outdated data. This concept does not protect against the failure that the OS saves outdated data or receives outdated data from a sensor and sends it with a valid timestamp.

The Start Concept may safeguard against hazards related to the start of a function. To give a start command, the user may perform a two-step action on the specific start function screen:

First he may need to draw a screen trajectory on the screen and afterwards he may need to perform a motion trajectory (gesture) while holding the smartphone in his hand. These two actions need to be performed in the specified order and with (only) a limited time span in between. The screen trajectory may be specific and suitable for the function the user wants to start, in order to safeguard against the hazard of starting a wrong function. Both trajectories, screen and motion, may be so specific that they are not performed randomly while interacting with the smartphone or having it in a neutral position. This has been evaluated in the feasibility study. Furthermore, the interaction may be in such a way that the user is not distracted while performing it. The user may still be able to monitor the area of operation of the function he wants to start rather than having to focus entirely on the smartphone. The algorithms for detecting the trajectories may be of a "pessimistic nature", i.e., the probability of false positives may be minimized. Additionally, the algorithms need to evaluate the plausibility of the given input and transition to a safe state if the given input is implausible.

The Stop Concept may safeguard against hazards related to the stop of a function. The possibility to perform a remote stop of the functions may not hinder the traditional way of stopping a function. This traditional way can still be used as a backup in case of a complete system shutdown. To avoid stop commission for availability reasons, the input to stop a function may be of a higher complexity than a single signal. To stop a function, the user may navigate to the corresponding stop function screen and perform a motion trajectory on this screen. The required trajectory may be the "Stop hand" gesture performed while the user holds the smartphone in his hand: The user may be showing the inner side of his hand. This motion trajectory may be suited to reduce user errors as it may be intuitive and commonly accepted as a gesture to command a stop. This input may stimulate both the acceleration and the rotation sensor in a characteristic way, as shown in a feasibility study. To use this redundancy, the input from one sensor may be sufficient to arrive at a positive interpretation of sensor data. The algorithms for detecting the trajectories may be of an "optimistic nature", i.e., the probability of false negatives may be reduced. Additionally, the gateway may need to monitor if sensor data is arriving continuously. In the feasibility study it has been observed that this data may be changing constantly even in a stable environment. A constant value over a longer time may be therefore an indication of a freeze failure of the application. If the sensor data is missing or it stays constant for too long, the gateway may need to command the system to transition to a safe state.

The all off Concept is an extension of the Stop Concept. The user may perform the "Stop hand" gesture as in the Stop Concept, followed by shaking the smartphone, which represents the shaking of the index finger as an additional commonly used gesture to command a stop. If the user performs this input, (all) functions of the tractor may stop. To protect against screen freeze failure and to allow faster operation, this input may be valid on every screen.

Continuous redundant user input may be well suited to safeguard against the hazard "Stop omission". With continuous user input, the gateway can monitor this input and stop immediately when this input stops or shows unwanted characteristics. In the Hitch per App project, this concept was used to protect the operation of the hitch. In this project, the concept can still be used for the hitch but not for other functions, as these functions have to operate for a long time and it might not be desired that the user may need to provide input for such a long time.

The Thin Client Concept: As unreliable hardware, the smartphone may be solely acting as an external sensor for the gateway. The smartphone delivers the raw data to the gateway and (all) interpretation algorithms are executed on this safe end. In this way, responsibility may be taken from the smartphone and placed on the gateway. This concept may be crucial for the overall safety of the system. At the same time, this puts a lot of overhead on the communication channel. In the feasibility study we therefore analyzed the consequences of this concept.

In order to safeguard against the hazard that the gateway's and the smartphone's views are not in synch, the View Concept may require the gateway to control the view navigation. The gateway commands the current view based on the input provided by the smartphone. In parallel, the gateway monitors the input provided on each view and evaluates the plausibility. If an input is implausible, indicating that the smartphone may be displaying the wrong view, the system may transition to a safe state.

To safeguard against safety-related security problems, the Wi-Fi may be encrypted. The encryption contributes to (all) safety goals that may be violated by an attacker.

To safeguard against communication failures, a standard safety channel with error detection and correction may be used. Based on the selected protocol, such a safety channel may be able to detect message corruption, message loss, message delay, and other failures. If the safety layer detects critical communication problems, it may need to command the system to transition to a safe state. An implemented safety channel comes with an overhead on message size, therefore the protocol may be selected carefully.

The system can (only) take responsibility for the remote control of functions if it is still able to send commands from the smartphone to the gateway. This might not be possible if the Wi-Fi connection is lost. A feasibility study has shown that (among other reasons) locking the smartphone or navigating to a different application or the home screen can also make the smartphone unable to send data to the gateway. In such cases the gateway may need to realize the inability of the smartphone to send commands and put the tractor in a safe state. This safety measure can highly reduce the user experience as there are use cases like the Feeder Mixer that may require the user to leave the range of the tractor's Wi-Fi. To be able to do so, the user may be able to disable the automated deactivation. However, this may not be the default setting and the user may be aware of the consequences of this setting.

To safeguard against the hazard resulting from user errors, the GUI design may be clear and unambiguous. The user may always be aware what setting he is currently influencing in which way. Furthermore, he may be aware of the consequences of his input, e.g. giving a start command on a start screen.

Too stop a function, a specific movement—a gesture—may be needed. To enable a more thorough analysis, a concrete gesture for the stop command may be selected. In accordance with the generally accepted "Stop hand" gesture, the stop gesture (or abort gesture) may be a display of the stop hand while the user is holding the smartphone in his hand.

There may be an "All stop" function, which includes a specific movement, i.e., a gesture. To enable a more thorough analysis, a concrete gesture for the "All stop" command may be selected. To get seamless integration with the stop gesture the "All stop" (or abort all) gesture may be a shaking of the hand while the user is holding the smartphone in his hand.

The start of a function may need a specific movement (gesture). This gesture may be the same for (all) functions. To enable a more thorough analysis, a concrete gesture for the start command may be selected. In accordance with other systems, it may be decided that the gesture to start a function may be to move the smartphone in a tilt movement away from the user.

Alternatively, for the PTO, a start gesture may be to rotate the phone, move the phone down and forward to reflect the usage of an existing switch in the current tractor command center. For the SCV, a start gesture may be to open a tab to reflect the start of a flow, move to the right and then up/down to reflect the usage of an existing switch in the current tractor command center. For the engine, a start gesture may be to drag a key into an ignition lock or to drag a pull starter. For the hitch, a start gesture may be to move to the right and then up/down to reflect the usage of an existing switch in the current tractor command center The command to start a function may comprise a common movement for (all) functions. To improve user experience, some function-specific gestures may be interesting. For the engine start, such an interesting gesture has been found that reflects the turning of a key in an ignition lock: The smartphone may be held in a horizontal position and then turned along the Y-axis by about 45 degrees. The user can choose in the settings if he wants to use the common tilt gesture or the gesture that reflects the turning of a key in an ignition lock. An alternative gesture may be to use an imaginary pull starter The start of a function may need a specific screen trajectory to be drawn by the user. This trajectory may be specific for each function. To enable a more thorough analysis, a concrete trajectory for each start command may be selected. For the PTO, the screen trajectory may be a clock or counter-clock-wise drawing of a circle to reflect the turning PTO. For the engine, the screen trajectory may be a movement to the rights and downwards, reflecting the simplified shape of a key. For the SCV, the screen trajectory may be a movement to the left or to the right to reflect the movement of the implement coil in the extend and retract direction, as illustrated on the currently existing buttons to control the SCV. The direction of the screen trajectory may also indicate the direction in which the SCV may move afterwards. For example, a trajectory to the left means a movement in the extend direction; a trajectory to the right means a movement in the retract direction.

The user may be able to adjust settings before the activation of a function or while the function is active. These settings come with different characteristics that need to be considered in safety concepts that safeguard against the "wrong setting" hazard. To cover them, three different concepts may be use: Feedback Concept, Screen Trajectory Concept, Confirmation Concept.

The different settings in the app need to be mapped to these concepts.

Choose functionality (hitch, PTO, SCV, engine): Feedback Concept
Front/Rear Hitch: Feedback Concept
Front/Rear PTO: Feedback Concept
Hitch direction: Screen Trajectory Concept
SCV direction: Screen Trajectory Concept
Engine RPM: Confirmation Concept
PTO Gear: Confirmation Concept
SCV: Confirmation Concept In certain scenarios, like filling the feeder mixer, the user of the remote control may leave the Wi-Fi range of the controlled tractor. In some scenarios, like the one described above, it might not be desired that the controlled functionality, e.g. the PTO, goes to the safe state, i.e., turns off.

The user may thus have the opportunity to deactivate such an automatic power off on connection lost. However, automatic power off may be safer and may therefore be the default setting. The app may also return to this setting on a new start Always power off on connection lost
Never power off on connection lost To guard against choosing the wrong tractor, the mobile communication device may be paired with ((only)) one tractor. To guard against choosing the wrong function (or wrong hitch, wrong PTO, wrong SCV), the function (hitch, PTO, SCV) that the user selects may be shown on the next screens (e.g. on the screens to control the hitch, on the screens for controlling the PTO). The selection of a wrong function can (only) become safety-critical if this function is started. Therefore, the Start Concept may include function-specific screen trajectories for every function.

To guard against a wrong hitch direction (Slide (part of the Start Concept)): the selection of the direction may be given by a specific screen trajectory. To guard against selecting the wrong (PTO) gear, the wrong SCV, or the wrong engine RPM, after the user selects the gear/SCV/engine RPM, the value that is received by the gateway may be sent back to the smartphone and the user may confirm this value again. To guard against a wrong SCV direction (Slide (part of the Start Concept)), the selection of the direction may be given by a specific screen trajectory: move a slider to the left for extend and to the right for retract.

To guard against the hitch, the PTO, the SCV or the Engine starting too late, if the timestamp of the sensor data received by the gateway is too old, it might not be used to start the functionalities. To guard against the hitch, the PTO, the SCV or the Engine stopping too late, the gateway may monitor the timestamps of the packages that arrive. If the timestamp is too old, it may stop (all) functions.

To guard against a hitch stop omission, continuous redundant user input may be monitored (e.g. keeping slider and tilt position. To guard against a PTO/SCV/Engine stop omission, on the screen for stopping the PTO/SCV/Engine, the user may perform a uniform stop gesture to stop the PTO/SCV/Engine. On every screen, the user may perform the "All stop" gesture to stop (all) functions ("emergency off").

To guard against a hitch start commission, to start the hitch, the user may perform the slide & tilt gesture, as this may be considered to be good from a usability and safety point of view in the previous project: The user first moves a slider up or down and directly afterwards performs a tilt movement. To guard against a PTO start commission, the specific screen trajectory for the PTO may be a circle, representing the turning PTO, followed by the uniform tilt gesture. To guard against a SCV start commission, the specific screen trajectory for the SCV may be to move a slider to the left or to the right, representing the direction of movement, followed by the uniform tilt gesture. To guard against engine start commission, the specific screen trajectory for the engine may be to move to the right and then down, representing the shape of a key, followed by the uniform tilt gesture. Instead of the common tilt gesture, an alternative gesture might be used that reflects the turning of a key in an ignition lock.

Safe Remote Operation of PTO

To remote-control the PTO the user first may need to navigate to the PTO view. The function that the user is currently controlling (the PTO) may be displayed on (all) subsequent views (Selection Concepts). He then may need to choose which PTO he wants to control, either the front or the rear PTO. Those chosen PTO may be displayed on (all) next views so that the user can correct his selection if necessary (Selection Concepts). Depending on the selected PTO, the user may choose a certain setting before he starts the PTO. For the front PTO no additional settings may be made, for the rear PTO the user can choose between four different gears to operate the PTO in: N, 540, 540E, 1000. After the selection, the gateway may be echoing the received setting back to the smartphone and the user may confirm the setting by drawing a confirmation hook on the screen (Selection Concepts). After the selection has been made, the user can move on to start the PTO. To this end, he navigates to the start PTO screen and draws the PTO start screen trajectory on the screen: a circle. After the screen trajectory the user may immediately perform the tilt gesture. After this input the PTO starts with the chosen setting and continuous running after the user puts the phone in a neutral position (Stop concept). If the user wants to stop the PTO, he may need to navigate to the stop PTO screen and perform the stop gesture (Stop Gesture).

Safe Remote Operation of SCV

To remote-control the SCV the user first may need to navigate to the SCV view. The function that the user is currently controlling (the SCV) may be displayed on (all) subsequent views (Selection Concepts). He then may need to choose which SCV he wants to control. After the selection, the gateway may be echoing the received setting back to the smartphone and the user may confirm the setting by drawing a confirmation hook on the screen (Selection Concepts). If the user wants to start the respective SCV he may navigate to the start SCV screen and move a slider in the left or right direction depending on the direction he wants to move the SCV, left for extend, right for retract (SCV Screen Trajectory). After the screen trajectory the user may immediately perform the tilt gesture (Start Gesture). After this input the SCV starts in the respective direction and may be continuous running after the user puts the phone in a neutral position (Stop concept). If the user wants to stop the PTO, he may need to navigate to the stop SCV screen and perform the stop gesture (Stop Gesture).

Safe Remote Operation of Engine

To remote-control the engine the user first may need to navigate to the engine view. The function that the user is currently controlling (the engine) may be displayed on (all) subsequent views (Selection Concepts). If the user wants to start the engine he may navigate to the start engine view. As captured in design decision Exception Start Gesture for "Engine Start", the user now has two possibilities to start the engine. Following the normal start concept, he can draw the engine specific screen trajectory on the screen, a movement to the right and upwards afterwards (Engine Screen Trajectory), followed by the tilt gesture to start the engine (Start Gesture). Following the alternative start concept, he can draw the engine specific screen trajectory on the screen, followed by a movement that reflects the turning of a key in an ignition lock to start the engine. To this end the smartphone may be hold in a horizontal position and afterward turned around the Y-Axis for about 45 degrees. While the engine may be running the user can change the RPM of the engine. To this end he may navigate to the set engine RPM view and choose the respective RPM from a scroll list with a preselection of possible RPMs. After the selection, the gateway may be echoing the received setting back to the smartphone and the user may confirm the setting by drawing a confirmation hook on the screen (Selection Concepts). After confirmation the engine RPM is adjusted. If the user wants to stop the engine he may navigate to the stop engine screen and perform the stop gesture (Stop Gesture).

In some systems, the failure "Hitch stop omission" was handled by monitoring continuous user input (hold slider and keep tilt position) and stopping when the continuous user input ends (release slider and leave tilt position). It was assumed that the monitored acceleration values (ax, ay, az) and the monitored orientation values (pitch, roll, yaw) have fluctuations even if the user holds the slider and keeps the phone in the tilt position. Likely stuck-at errors and screen freezes can thus be handled by stopping if the fluctuations end. Considering this project and the usage scenarios for remote-controlling engine, hitch, PTO, and SCV, continuous user input might not feasible for usability reasons. Furthermore, it may be considered that the user may switch between the control views while PTO, SCV, and engine are active.

- The stopping of each functionality (engine, PTO, SCV) may be realized by a special common movement on the respective stop screen of the functionality.
- Considering this solution, stopping one functionality may be infeasible if a screen freeze prevents the user from changing to the view of the functionality. Thus, an "All stop" function may be introduced that stops (all) functionalities (engine, PTO, SCV) with a special "All off" movement.
- Different stop movements for each functionality (→may require no navigation to the screen to distinguish between functions to be stopped→may require no all off)

The user may first need to navigate to the respective view, then draw a trajectory that may be specific for the function he wants to start. Directly after drawing this trajectory, the user may have to perform a movement (gesture) that may be common for (all) functions to start.

The values of both the trajectory and the movement may be transmitted "piecewise" to allow reliable interpretation at the gateway. In addition to the specific trajectory, a specific movement may be used.

During the operation of the remote control, certain values may be selected from a range of values (e.g., select front/rear hitch, select SCV). Depending on the prerequisites for this selection, different concepts for safeguarding against the respective "Wrong selection" hazard may be used.

The following concepts may be used:
Screen Feedback: Give feedback about the perceived value on the next view
Trajectory: Specific trajectory on a screen refers to a certain value
Confirmation: Give feedback and confirm with a trajectory Have one concept for every selection that may be made. In this case, the "strongest" concept may be chosen, which might influence the user experience negatively.

Consequently, if no countermeasures are taken, the user may mix up tractors and thus connect to a wrong tractor. The countermeasure that is applied here is the Pairing Concept: The user may go inside the cabin of the tractor he wants to connect to see the tractor-specific pairing code and enter it in the app.

The hazardous failures regarding the start of a function are start commission and start late. If the function starts without a given command, the area of operation might not be safe, e.g., someone might be inside the feeder mixer. If the start is delayed too much, the user might enter the area of operation between the given command and the start of the function, e.g., go inside the feeder mixer to check its operational readiness.

To start a function, the user may be required to provide the following specific input:
a trajectory may be drawn on the screen and
a gesture may be performed by the user while holding the smartphone in his hand.

Both inputs may contain more than one value, deliver characteristic sensor inputs, and need to be performed together in order to be interpreted as a valid start command.

The user might want to start a different function, e.g. PTO instead of hitch. To reduce the chances of a user confusing functions, it may be required that the start command is given on the specific start screen, e.g. on the PTO start screen. In additionally may be required that the trajectory drawn on the screen or the start gesture performed is specific for the respective function.

The smartphone might (only) function as a remote sensor and (all) the data interpretation may be done on the reliable hardware at the gateway, where it may be assumed that algorithms work as specified.

Both the screen trajectory and the motion trajectory are part of the required start input. Therefore, both the touchscreen sensor and the motion sensor need to fail in order to cause a start commission. To reduce for both sensors the chance of being interpreted as a valid start command, it may be required a pessimistic detection algorithm that limits the probability of false positives. Additionally, it may be required failure detection of the input data and transition to a safe error state in the case of implausible input.

The smartphone might cause a critical delay of the start of the function through sensor, OS (Operating System), or app failures. Sensor failures may be addressed as follows: The two different involved sensors have to deliver the values in a predefined order with not more than a defined short time span between the two. If one of the sensors is delayed, the start command might not be considered as valid. For the app on the smartphone, we again may require state-of-the-art development.

For remote stop, the smartphone might take responsibility if the user is currently within the range of the tractor's Wi-Fi (Wireless Fidelity, a wireless local area network). Therefore, the function may need to stop if the user leaves this range or the user may be made aware that the remote stop may not function anymore; see the automated deactivation concept.

In the system, there may be two stop commands: the command to stop one function and the command to stop all functions. Both are gestures performed by the user while holding the smartphone in his hand. To stop one function, the user may first navigate to the respective stop screen and then shows the inner surface of the hand holding the smartphone. To stop all functions, the user may extend the previous gesture by moving the phone from left to right and back, representing the shaking of a stretched index finger. The motion trajectory to stop all functions may be executed on any screen—see gesture evaluation for a detailed description of the trajectory.

A touchscreen sensor failure can cause a stop omission, as the user might not be able to navigate to the respective stop screen anymore. In such a case, the user can perform the gesture to stop (all) functions on any screen. The underlying assumption here may be that even in case of a failure in the touchscreen sensor, the motion sensors remain operational.

For the acceleration sensor, which may be required to recognize the all stop gesture, it may require failure detection and transition to a safe state in case of a failure. Because of jitter, the sensor may deliver fluctuating values even if the phone is held still. Therefore, the delivery of unchanging values may be considered as implausible. This way, stuck-at errors may be detected and handled. In contrast to the start of a function, it may require a reduction of false negatives in the interpretation of the delivered sensor values. For the start case, redundancy may be used in such a way that both the screen sensor and the motion sensor have to deliver the specific input to start a function. For the stop case, redundancy may be used in such a way that either the acceleration sensor's or the rotation sensor's delivery of a valid stop command may initiate the stop of a function. For the rotation sensor, which may be also involved in the recognition of the all stop gesture, the same considerations apply as for the rotation sensor. The operating system can also cause a stop omission. The requirements here are similar to those for sensor failures.

The required redundancy in the evaluation of the (all) stop gesture and the applicability of the gesture on any screen handles sensor failures as causes of a critical stop delay. To safeguard against the failure that the OS may be sending outdated data to the gateway, it may be required a Timestamp Concept: The gateway regularly provides the smartphone with timestamps, which may be used to sign (all) packages from the smartphone with a timestamp. This way the gateway may notice when it receives outdated data.

Settings may (all) be made via the screen, therefore we (only) consider the touchscreen sensor here. We have three different measures to safeguard against the selection of wrong values. The need for different concepts arises from the different user experiences and the restrictions for implementation implied by the concepts. The Feedback Concept shows a selection that has been made on the next screens. In addition, it may be the responsibility of the reliable gateway to perform navigation monitoring and to evaluate the plausibility of given inputs on the current screen (View Concept). The Screen Trajectory Concept may require a specific screen trajectory for a specific setting, e.g. slider up for hitch up. The Confirmation Concept is a combination of the previous two concepts. The user selects a setting and the gateway sends back the received value that the user may need to confirm with a screen trajectory.

For changing the setting of an active function, (only) the Confirmation Concept may be applicable. The Feedback Concept may require a next screen, which might not be available in the case of an actively running function. The Screen Trajectory Concept may require an unambiguous trajectory for every setting and may be therefore limited to a very small number of possible settings. As it may have to deal with a great number of possible settings here, such as engine RPMs, the Screen Trajectory Concept cannot be applied either. The remaining Confirmation Concept may be able to safeguard against system failures that generate unintended function settings for actively running functions.

A smartphone may for example comprise the following sensors:
Touchscreen
Barometer
3-axis gyro sensor
Acceleration sensor
Ambient light sensor
Proximity sensor It may be assumed that a smartphone has a touch display. Via buttons and sliders and other elements, input on the touch display may be accessed very precisely. The analysis yielded that it may be possible to get slider values of with a sufficient degree of precision. It may be additionally possible to check if the finger used to control the slider may stay on this GUI element. Also, regarding free movement with the finger on the screen, it may be possible to track the current finger position with a sufficient degree of precision. For a start gesture, the use of an element of the touch display seems reasonable. For example, a slider may be used to start the hitch in a certain direction. In some embodiments, the SCV may be an output with a defined direction. For a stop gesture, the use of the touchscreen might not be appropriate. The user of the app might put on gloves after the system has been started and a touch display can no longer be operated.

The gyro sensor may be used to measure the rotation acceleration around the x-, y-, and z-axis. It may be a standard sensor and availability may be considered to be high. Our analysis yielded that iOS offers an interface to read very fine-grained sensor data. The values received from the sensor have such a jitter that it may be monitored if the sensor is still alive. Most gestures performed while holding a smartphone in one's hand may stimulate the gyro sensor. At the same time, gestures including a rotation quickly become very specific.

The acceleration sensor may be used to measure acceleration along the x-, y-, and z-axis. It may be a standard sensor and availability may be considered to be very high. Our analysis yielded that iOS offers an interface to read very fine-grained sensor data. The values received from the sensors produce such a jitter that it may be monitored if the sensor is still alive. Most gestures performed while holding a smartphone in one's hand may stimulate the acceleration sensor. In general, almost every movement performed with the smartphone in hand may stimulate the sensor. Therefore, any gesture that includes the acceleration sensor runs the risk of producing false positives, which may decrease usability.

For the stop gesture, the two motion sensors may be used for redundancy: if one of the sensor inputs is a valid stop gesture, the stop command may be triggered. As for the stop gesture, for the all off gesture the two motion sensors are also used for redundancy: if one of the sensor inputs is a valid all off gesture, the stop command may be triggered. As the all off Concept may require the ability to give the all off input on any screen, the probability of false positives may be minimized to maintain good usability.

The tilt gesture is part of the Start Concept and may be included in starting (all of the) functions. To reduce the chance of false positives and therefore the start commission hazard, both sensors' inputs may have to be recognized as the tilt gesture in order to trigger a start command. The analysis showed that we may have satisfactory performance (only) in the active mode. In every other mode, the app (only) receives the values of the acceleration sensor, which might not be enough, as any gesture may need to include heterogeneous redundancy with respect to the sensors used.

One possible approach to overcome this challenge may be to include an app-specific lock screen. Such a screen may be activated by the user within the app and prevent any change based on input via the touchscreen. The issue with this approach may be the fact that there might also be external events that trigger the operating system to set the mode of the app to something other than active.

As part of the View Concept, the gateway may maintain the current view and every change in the current view may be orchestrated by this component. The evaluation has shown that in the case of near-by operation, the delay may be neglected. In the case of far-away operation, responsiveness can decrease significantly. This observation gives rise to the supporting requirement that the user may be informed when the strength of the connection from the smartphone to the gateway drops below a certain threshold.

Before the user may be allowed to start a function, he may send a picture of the tractor or the implement to the gateway. The gateway may then decide based on this picture if it is safe to start the function. Depending on the decision, the gateway may then grant the start of the function for a limited time or deny the start. Intelligent functions such as image recognition as part of safety-critical systems are still an unresolved problem.

Near-field communication (NFC), may be used to connect the user to certain locations. NFC nodes may be placed at locations that are assumed to be safe, e.g. the place at the tractor where remote buttons are currently located, or the cabin of another tractor. Before the user is allowed to start a function, he may need to perform NFC to guarantee that he may be currently at such a potentially safe place. Afterwards the system may allow a start for a certain limited amount of time. A challenge regarding this approach may be the usage within a different tractor. Such a tractor would need to be equipped with the needed NFC nodes and these nodes would need to be known by the remotely controlled tractor in order to allow the user to remote-control from this tractor.

A possible approach for overcoming some of the shortcomings of these two techniques may be to combine them. The remotely controlled tractor can possess NFC nodes so that the user may be able to perform remote control if he is located close to the tractor. If the user is sitting in the cabin of another tractor, he can take a picture of the remotely controlled tractor and send it to the gateway to show that he is currently in a safe place.

The app may have an app-specific lock screen that the user may need to use instead of the smartphone-specific lock functionality. On the lock screen, (all) screen input may be ignored except for a predefined screen trajectory to leave the lock screen. On the lock screen, the all off gesture may be a possible input. The app may inform the user if the Wi-Fi connection strength to the gateway drops below a certain threshold. The app may offer the possibility to deactivate automatic off on connection lost. This may not be the default setting and it may be a setting that may be made again every time the app is restarted. In case of a lost connection, the app can no longer assume responsibility for safe operation. The user may be aware of the consequences of this setting.

The use cases may describe how the user may interact with the system once the remote control has been activated.

For example, the machine may be a tractor, configured to act as a feeder mixer with a goal of mixing the feed with optimal quality and minimal body work (high quality may require adjusting the PTO rotation speed several times; without remote control, this may require a lot of body work).

The mixer-tractor may be connected to the mixer implement, the mixer implement may be empty, the mixer-tractor may be in "stationary mode" and the farmer may have a stable Wi-Fi connection to the mixer-tractor. PTO limits may be set on the tractor.

In an exemplary flow of events, the farmer starts the app. On the VT of the mixer-tractor, the required pairing code may be displayed. The farmer checks the required pairing code and enters it in the app. The app connects to the mixer-tractor and shows a view for selecting one of the controllable functions (engine/PTO/SCV/hitch). The farmer selects "Engine". The app displays (all) options for controlling the engine (start, stop, set RPM (Revolutions per minute)). The farmer selects "Start engine". The app displays the "Start engine" view. On the start engine view, the farmer performs the "Start engine" screen trajectory, i.e., he moves his finger first to the right and then downwards. After the screen trajectory, the farmer performs the start gesture, i.e., he tilts the phone. The engine of the mixer-tractor starts. The app displays (all) options for controlling the engine (start, stop, set RPM). The farmer selects "Set engine RPM". The app displays possible RPM values in a scroll list. The farmer chooses his desired engine RPM. The app shows the chosen RPM and a confirmation request. The farmer confirms the request by drawing a confirmation check mark on the screen. The mixer-tractor adapts its engine RPM according to the desired RPM and the app displays the view for controlling the engine (start, stop, set RPM). The farmer selects "back". The app displays the overview view for selecting one of the controllable components (engine/PTO/SCV/hitch). The farmer selects "Settings". The app displays (all) possible settings. The farmer selects "Remote settings". The app displays the remote settings. The farmer selects "Deactivate stop on connection lost". The app displays a confirmation screen. The farmer confirms the setting by drawing a confirmation check mark on the screen. The app displays the remote settings. The farmer selects "Back". The app displays (all) possible settings. The farmer selects "Back". The app displays the overview view for selecting one of the controllable functions (engine/PTO/SCV/hitch). The farmer selects "PTO". The app displays (all) PTOs of the tractor (PTO front, PTO rear). The farmer selects "PTO rear". The app displays the controllable functionality of the rear PTO (choose gear, start, stop) Farmer selects "Choose PTO gear". The app displays (all) possible gears of the rear PTO. Farmer selects a PTO gear. The app shows the chosen PTO gear and a confirmation request. The farmer confirms the PTO gear by drawing a confirmation check mark on the screen. The selected gear may be adjusted on the mixer-tractor and the app displays the controllable functionality of the rear PTO (choose gear, start, stop). The farmer selects "Start PTO". The app shows a view for starting the PTO. The view shows the current PTO gear, the current engine RPM, the PTO limits, and the selected remote setting. On the "Start PTO" view, the farmer performs the "Start PTO" screen trajectory, i.e., he moves his finger in a circle. After the screen trajectory, the farmer performs the start gesture, i.e., he tilts the phone. The PTO starts with the performed settings. The farmer selects the "Lock screen" option. The app displays the "lock screen". Farmer puts the remote device away, e.g. into his pocket, and gets new feed ingredients from a distant location. The app displays that it has lost the connection to the tractor. The farmer comes back, puts the new feed material in the mixer and gets the remote device to adjust the engine RPM with respect to optimal mixing of the new material. The app automatically reconnects, displays that it has automatically reconnected and asks for confirmation. The farmer confirms the automatic reconnection by drawing a confirmation check mark on the screen. The app displays the lock screen. The farmer unlocks the app by drawing the "Unlock" trajectory on the screen, i.e., a half circle representing the upper part of a standard lock. The app displays the overview view for selecting one of the controllable functions (engine/PTO/SCV/hitch). The farmer selects "Engine" in order to adjust the "Engine RPM". The app displays (all) options for controlling the engine (start, stop, set RPM). The steps described above are repeated to adjust the "Engine RPM". The farmer repeats the steps described above to get new feed ingredients and to adjust the PTO accordingly. The farmer selects "Stop PTO". The farmer performs the "Stop gesture" on the "Stop PTO" view, i.e., he shows the "Stop hand" while holding the smartphone in his hand. The PTO of the mixer-tractor stops.

As a result the, feed may be mixed, the mixer-tractor may be connected to the mixer implement, the mixer-tractor engine may be on, the mixer-tractor may be in "stationary mode" and the farmer may have a stable Wi-Fi connection to the mixer-tractor Wi-Fi. The pairing concept may force the farmer to visit the mixer-tractor at least once.

For example, the machine may be a tractor, configured to act as a slurry tanker (in conjunction with a slurry tank). A goal may be to fill the slurry tank. The tractor may be connected to the slurry tank. The tractor may be in "stationary mode". The tractor engine may be off. The tractor may be standing near the slurry pit. A filling hose may be connected to the slurry tank. The farmer may have a stable Wi-Fi connection to the tractor with the slurry tank.

In an exemplary flow of events, the farmer starts the app, selects the tractor with the slurry tank in the app and pairs it with this tractor as previously described. The app connects to the tractor with the slurry tank and displays the controllable functions. The farmer starts the engine, sets the engine RPM, selects the gear of the PTO rear and starts the PTO in the same way as previously described. The PTO starts. The app displays the controllable functionality of the PTO. Once the filling is completed, the farmer stops the PTO as previously described. The farmer closes the app. The app informs the farmer that the engine is still running and asks the farmer whether he wants to stop the engine when closing the app. The farmer confirms stopping the engine by drawing a confirmation check mark on the screen. The app unpairs from the tractor with the slurry tank and the engine is stopped. As a result the, slurry tank may be filled.

For example, the machine may be a tractor, configured to use a sprayer. The goal may be to fill the sprayer, which may be connected to the tractor. The tractor may be in stationary mode, with the engine off, and standing near the filling station. The water filling hose may be connected to the sprayer and the farmer may have a stable Wi-Fi (Wireless Fidelity, a wireless local area network) connection to the tractor with the sprayer.

In an exemplary flow of events, the farmer selects the tractor with the sprayer in the app and pairs it with this tractor as in previous exemplary flow of events. Starting the engine, setting the engine RPM, and selecting the gear of PTO rear are performed in the same way as in previous exemplary flow of events. The farmer adjusts the valves on the sprayer to "Filling mode" and starts the PTO as in previous exemplary flow of events. The app turns the PTO on and displays the controllable functionality of the component. Once the filling is completed, the farmer changes the sprayer valves from "Filling mode" to "Mixing mode". The farmer closes the app. The app informs the farmer that engine and PTO are on and asks if it should stop both before closing. The farmer denies stopping before closing by drawing a negation cross on the screen. The app unpairs from the tractor with the sprayer and closes. The farmer enters the tractor with the sprayer and drives towards the field with active mixing.

After the exemplary flow of events, the sprayer may be filled, the tractor engine may be on, the tractor may be driving, the PTO may be running, and the tractor may be connected to the sprayer. If the farmer selects letting the function run after closing the app, the app might no longer be responsible for the control of the function.

For example, the machine may be an overloading tractor, configured to use an air seeder/spreader. The goal may be to fill the air seeder, which may be connected to the tractor. The tractor may be in stationary mode. The cover of the seeder may be opened. The farmer may have a stable Wi-Fi connection to the overloading tractor. Settings to control the SCV may have been set.

In an exemplary flow of events, the farmer selects the overloading tractor in the app, pairs it with this tractor, and turns the engine on as in previous exemplary flow of events. The engine turns on. The app displays the controllable functions (Engine, Hitch, SCV, PTO). The farmer selects "SCV". The app shows (all) SCVs in a scroll list. The farmer selects "SCV 1". The app displays the chosen SCV and asks for confirmation. The farmer confirms the chosen SCV by drawing a confirmation check mark on the screen. The app displays the controllable functionality of the SCV (start, stop). The farmer selects "Start SCV". The app displays the "Start SCV" screen. The farmer initiates extension of the SCV by moving a slider from a central position to the left (for retraction: move to the right). Directly afterwards the farmer performs the start gesture, i.e., he tilts the phone. SCV1 extends. The app displays the "Start SCV" view. The farmer selects "Back". The app displays the controllable functionality of the SCV (start, stop). Once the trailer has reached the desired position, the farmer selects "Stop SCV". The app displays the "Stop SCV" screen. The farmer performs the "Stop gesture" on the "Stop SCV" view, i.e., he shows the "Stop hand" while holding the smartphone in his hand. SCV1 stops. The app shows (all) SCVs in a scroll list. The farmer selects "SCV2". The farmer performs the steps described above to confirm, start, and stop SCV2 once the air seeder is filled. The farmer selects "SCV 1". The farmer performs the steps described above to confirm, start, and stop SCV1 once the trailer has reached the desired position. The app shows (all) SCVs in a scroll list. The farmer selects "Back". The app displays the controllable functions (Engine, Hitch, SCV, PTO). The farmer selects "Engine". The app displays the controllable functionality of the engine. The farmer selects "Stop engine". The app displays the "Stop engine" view. The farmer performs the "Stop gesture" on the "Stop SCV" view, i.e., he shows the "Stop hand" while holding the smartphone in his hand. The engine turns off. The app displays the controllable functions. The farmer closes the app. The app unpairs from the overloading tractor.

After the flow of events, the air seeder may be filled, the overloading tractor may be connected to the trailer. The overloading tractor may be in "stationary mode". The cover of the seeder may be opened. The farmer may have a stable Wi-Fi connection to the overloading tractor.

A late stop of the SCV may seem time-critical in this scenario, as the farmer may have to go back from the start screen and to the stop screen before he can perform the stop gesture to stop the SCV.

For example, the machine may be a tractor with an auger. The goal may be to fill goods in a silo. The tractor may be connected to the auger, may be stationary node and the farmer may have a stable Wi-Wi connection to the tractor with the auger.

In an exemplary flow of events the farmer selects the tractor with the auger in the app and pairs it with this tractor. Pairing, start engine, set engine RPM, select gear of PTO rear, start PTO, and stop PTO once the filling is completed are performed in the same way as in previous exemplary flow of events. The farmer stops the engine as in previous exemplary flow of events. The engine turns off. The farmer closes the app. The app unpairs from the tractor with the auger.

Figure 3A:
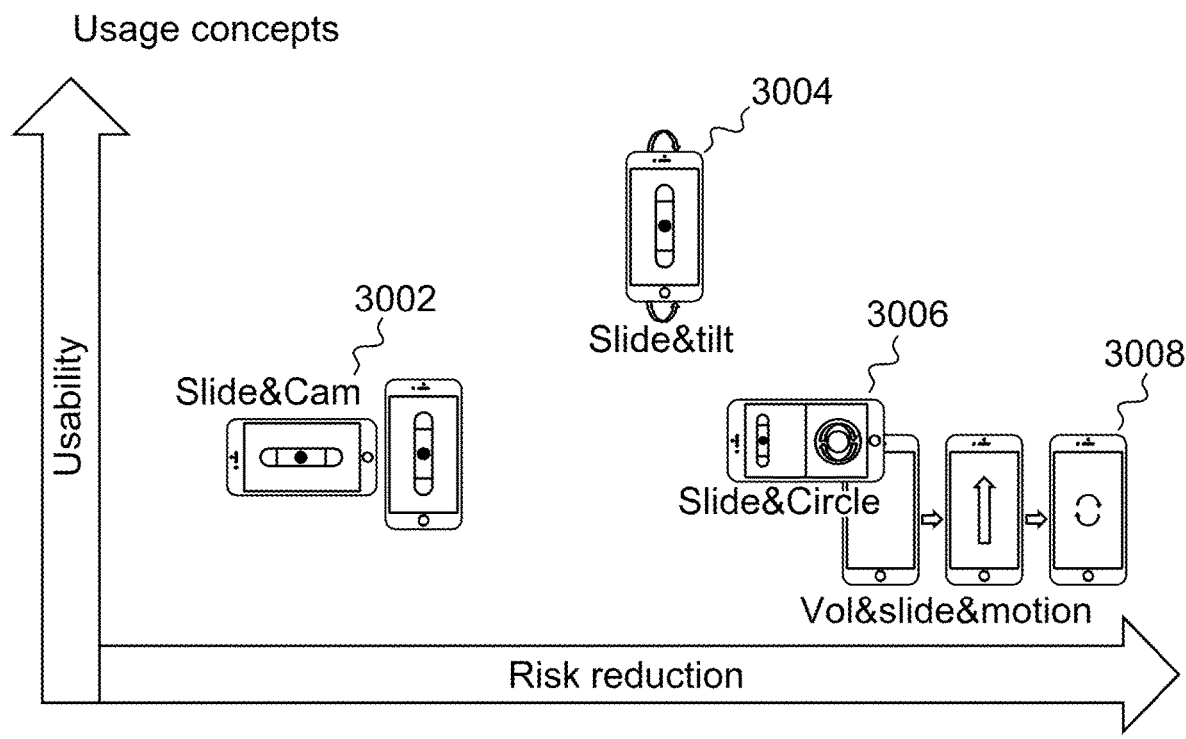
FIG. 3a-3c illustrate a number of exemplary embodiments.
Figure 3B:
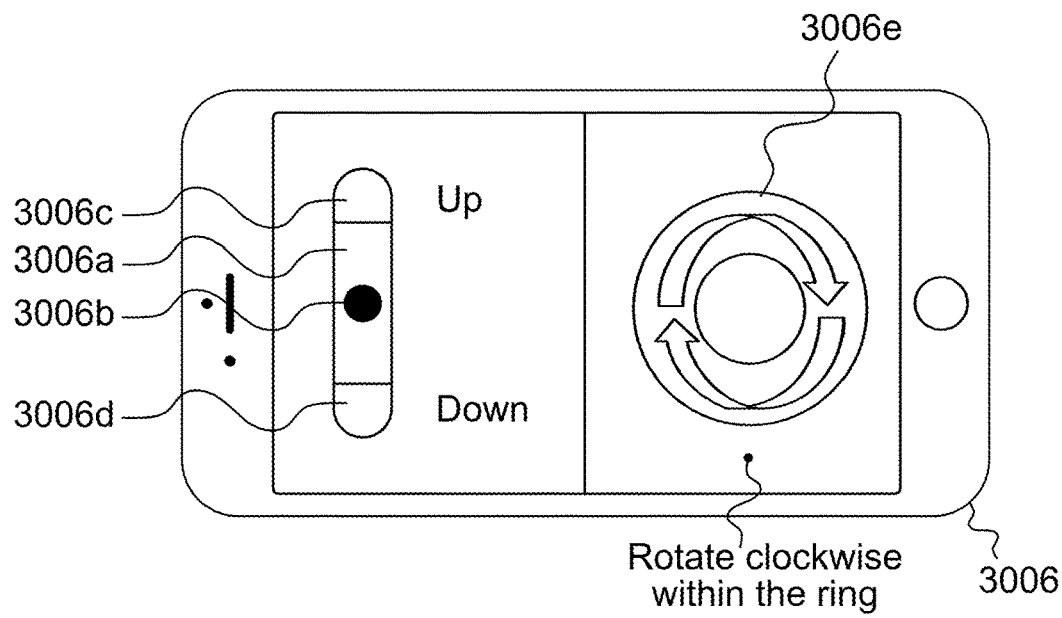

FIG. 3a illustrates a number of exemplary embodiments. 3002 illustrates an exemplary embodiment (slide & cam), wherein the first user input sensor data corresponds to touch-screen user input, and wherein the second user input sensor data corresponds to camera sensor data. 3004 illustrates a further exemplary embodiment (slide & tilt), which will be introduced in more detail later. 3006 (also in FIG. 3b) illustrates another exemplary embodiment (slide & circle), wherein the first user input sensor data corresponds to touch screen coordinates of a first section of a touch screen display displaying a slider 3006a comprising a starting point 3006b, an up position 3006c and a down position 3006d. The second user input sensor data may correspond to touch screen coordinates of a second section of the touch screen display showing a circular display element 3006e. Based on the first user input signal data, the controlling is activated/unlocked using the slider 3006a as will be illustrated subsequently (similar to 3004a in FIG. 3c), and based on the second user input sensor data, an extent of the controlling is changed in a continuous circular motion 3006e. 3008 shows another exemplary embodiment based on first, second and third user input sensor data (volume buttons, touch screen coordinates, gyroscopic/acceleration sensor data). FIG. 3a further illustrates a rating of the aforementioned embodiments using the categories usability and risk reduction.

Figure 3C:
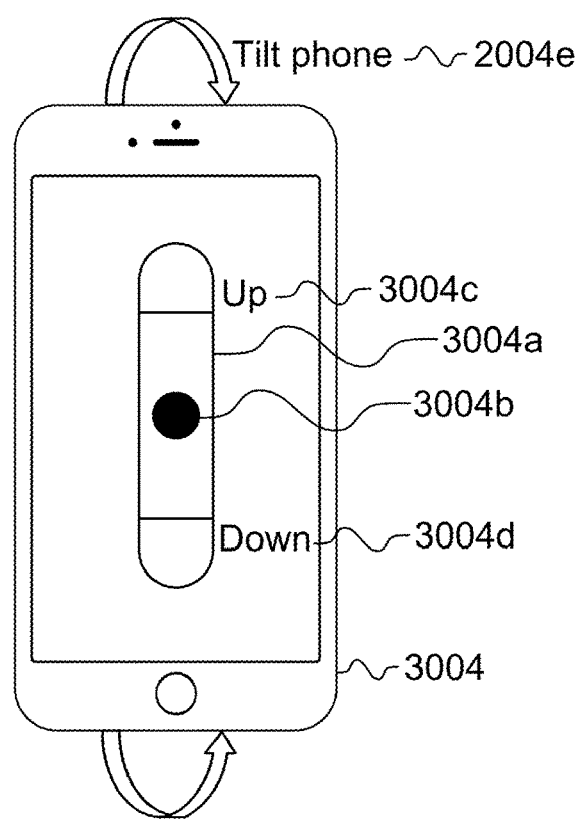

FIG. 3c shows an exemplary embodiment (slide & tilt 3004). The first user input sensor data may correspond to touch screen coordinates (e.g. to a touch trajectory on a touch screen based on a plurality of touch screen coordinates). The second input sensor data may correspond to angular data (tilt) 3004e of a gyroscope. The control module 16 may be configured to provide the sensor input signal to the machine control entity 300 to control at least one of a power take-off, a valve and an engine of the machine 350 (e.g. of a tractor). The control module 16 may be further configured to provide the sensor input signal to the machine control entity 300 to control a hitch of a tractor.

In the exemplary embodiment, the apparatus 10 may correspond to an app running on the mobile communication device 100. A user intending to control the hitch (or the PTO) may start the app, connect to a machine control entity 300 of the tractor and navigate into a front- or rear-hitch (or PTO) control view. After connection, the machine control entity may validate and check for plausibility the user input supplied by the user.

To move the hitch (or control a directivity of the PTO), the operator may first select the direction via a touch-screen slider 3004a. The user may e.g. put a finger on a button 3004b in the middle of the slider 3004a. Optionally, the user may unlock the slider (as may be indicated by a short vibration feedback). The user may move the slider 3004a in a chosen direction (up 3004c or down 3004d) until a target area or range may be reached. A continuous movement may be required for the touch-screen input to pass the plausibility check at the machine control entity 300.

Then, the operator may tilt 3004e the phone (e.g. to a predetermined amount). Here, too, a continuous movement may be required to pass the plausibility check. The movement may be guided by increasing vibration, and a target area may be signified through a step in vibration. While both "enablers" are in their target area, the hitch may move.

To further increase a usability and safety, a specific vibration design may be used to better distinguish up and down movement as well as different relevant states of the apparatus in general. Correspondingly, the vibration design may clearly indicate when the phone is tilted 3004e in a "hitch movement position". Initially the phone may be tilted in a "downward" direction, supporting a "TV remote control metaphor".

Instead of slider-button 3004a; 3004b, in some embodiments, a much larger button design might be chosen to ease the usage. On the other hand, this might in turn favor accidental usage. Visual elements on the feedback presentation device 20 may make it obvious to distinguish "up" and "down". In relation to the target tilting area (i.e. the area that keeps the hitch movement ongoing) there may be a trade-off: the broader, the easier to use, the narrower the higher the safety. The slider might also be realized in a way so that it is not possible to manipulate it directly. First, the finger may need to rest on the slider 3004a for a pre-determined time-period (e.g. 1 second) before it can actually be moved.

In at least some embodiments, the slider 3004a may be realized in a way that makes unwanted manipulation less probable. There may be a continuous finger movement, e.g. from the center 3004b towards the end 3004c; 3004d. When a (rather small) area in the end is then reached, the hitch direction may be chosen and the slide may be successful. For the tilt 3004e, too, a continuous movement may be required. Vibration design (as mentioned before) may guide the tilt action.

In at least some embodiments, the control module 34 may be configured to adjust for a variance in the tilt angular sensor data induced by unsteady hands of an operator and the vibration of the phone to detect stuck-at failures of the tilt sensor, e.g. for the plausibility check. In various embodiments, the tilting amount may be relative to a start position. The start position may be determined by the precedent slide action.

In embodiments, the control module 34 may be configured to control the machine based on a number of criteria. The touch screen coordinates may be used to determine a direction (up, down, directivity of a rotation, directivity of a hydraulic system) and activation (yes, no) of the hitch, while the angular sensor data may be user to activate the (hitch) movement and extent. The control module 34 may be configured to use thresholds to validate (activate the controlling) based on the first user input sensor data (touch screen coordinates), e.g. the slider is moved into a position, and may further use the second user input sensor data to further validate and/or check for plausibility the first and second user input sensor data, e.g. by using a second threshold for the angular sensor data beyond which a hitch movement starts. The control module 34 may be configured to check the first and second user input sensor data for plausibility, e.g. derived from established failure models for sensors. The control module 34 may e.g. be configured to check for stuck at (random/constant) sensor data, check for a (continuous) change in the sensor data, check for an offset (add/multiply constant), check for noise (add random), check for duplicate sensor data, check for a delay in received sensor data, and/or check for omission of sensor data.

For example, at least some aspects of remote controlling a hitch may be transferred to a remote control of a valve, e.g. an SCV. Hitch-concept: To start an upward or downward movement of the hitch, a vertical slider may be moved upwards or downwards and the smartphone may be tilted afterwards (e.g. similar to tilting a remote control of a television when pointing the remote control towards the television. Hydraulic valve (e.g. SCV)-concept: To start an inflow or outflow a horizontal slider may be moved/traced to the right or to the left and the smartphone may be tilted (afterwards).

For example, at least some aspects of remote controlling a start of a hitch may be transferred to a remote control of a start of an engine. Hitch-concept: To start an upward or downward movement of the hitch, a vertical slider may be moved upwards or downwards and the smartphone may be tilted afterwards (e.g. similar to tilting a remote control of a television when pointing the remote control towards the television. Engine-concept: To start the engine/motor, a key may be moved into a keyhole on a smartphone display (or a key may be traced on the smartphone display) and the smartphone may be moved forward (e.g. towards the tractor) and rotated (as if placing a key put in the ignition lock and turning it).

For example, at least some aspects of remote controlling a start of a hitch may be transferred to a remote control of a start of a power take-off (PTO). Hitch-concept: To start an upward or downward movement of the hitch, a vertical slider may be moved upwards or downwards and the smartphone may be tilted afterwards (e.g. similar to tilting a remote control of a television when pointing the remote control towards the television. PTO-concept: To start a rotation of the PTO, a circle may be traced using a finger and the smartphone may be tilted afterwards.

Further, the control module 34 may be configured to determine the plausibility based on the timing of the first and second user input sensor data, e.g. the slide & tilt timing (stop before, start before, fully before, same time, stop after, start after, fully after).

At least some embodiments may provide a remote control for a wide range of new cases. For example, within the case "mixing fodder", a user may require different functionalities. Having a remote control of only a single functionality, the remote control might not provide an additional value, as the remaining functionalities might still have to be controlled from the tractor cabin. On the other hand, in such cases (e.g. while mixing fodder), a user might want to focus on other tasks. In such cases, a mounting and dismounting onto/from the tractor cabin may be reduced by up to 80%.

Figure 4:
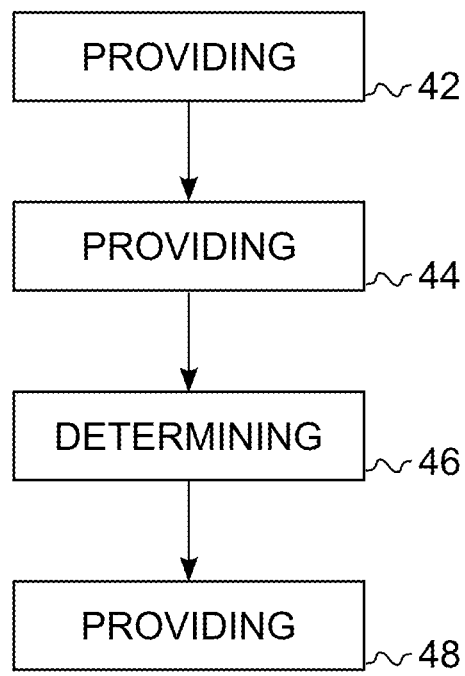
FIG. 4 illustrates a flowchart of an embodiment of a method for a mobile communication device for providing a sensor input signal to a machine control entity to control a machine.

FIG. 4 shows a flow chart of an embodiment of a method for a mobile communication device 100 for providing a sensor input signal to an external machine control entity 300 to control a machine 350. The method comprises providing 42 first user input sensor data. The method further comprises providing 44 second user input sensor data. The method further comprises determining 46 the sensor input signal based on the first user input sensor data and the second user input sensor data. The method further comprises providing 48 the sensor input signal for sensor data processing and validation to the machine control entity 300 to control at least one of a force transmission interface of the machine 350 for an external component and an engine of the machine 350.

Figure 5:
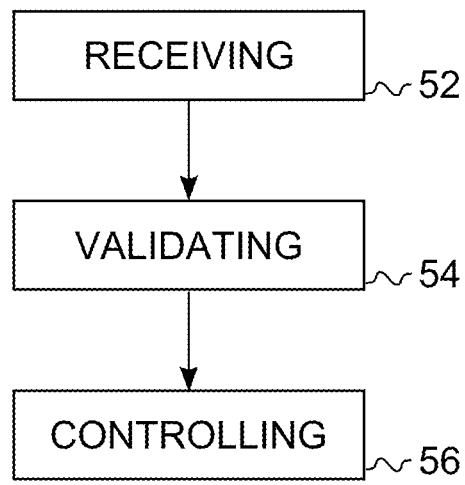
FIG. 5 illustrates a flow chart of an embodiment of a method for a machine control entity for controlling a machine based on a sensor input signal from a mobile communication device.

FIG. 5 shows a flow chart of an embodiment of a method for a machine control entity 300 for controlling a machine 350 based on a sensor input signal from a mobile communication device 100. The method comprises receiving 52 the sensor input signal from the mobile communication device 100. The sensor input signal comprises information related to first user input sensor data and information related to second user input sensor data. The method further comprises validating 54 the second user input sensor data based on the first user input sensor data. The validation is based on a comparison of the first user input sensor data with at least one validation criterion. The method further comprises controlling 56 at least one of a force transmission interface of the machine 350 for an external component and an engine of the machine 350 based on the first user input sensor data and the second user input sensor data after the second user input sensor data has been validated.

Further information on implementation details of embodiments may be found in European patent application EP15193248.0.

Some embodiments comprise a digital control circuit installed within the apparatus for performing the method. Such a digital control circuit, e.g. a Digital Signal Processor (DSP), needs to be programmed accordingly. Hence, yet further embodiments also provide a computer program having a program code for performing embodiments of the method, when the computer program is executed on a computer, a digital processor, or a programmable hardware component. A further embodiment is a computer readable storage medium storing instructions which, when executed by a computer, processor, or programmable hardware component, cause the computer to implement one of the methods described herein.

A person of skill in the art would readily recognize that steps of various above-described methods can be performed by programmed computers. Herein, some embodiments are also intended to cover program storage devices, e.g., digital data storage media, which are ma-chine or computer readable and encode machine-executable or computer-executable pro-grams of instructions where said instructions perform some or all of the steps of methods described herein. The program storage devices may be, e.g., digital memories, magnetic storage media such as magnetic disks and magnetic tapes, hard drives, or optically readable digital data storage media. The embodiments are also intended to cover computers programmed to perform said steps of methods described herein or (field) programmable logic arrays ((F)PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing or to perform a certain function, respectively. Hence, a "means for s.th." may as well be understood as a "means being adapted or suited for s.th.". A means being adapted for performing a certain function does, hence, not imply that such means necessarily is performing said function (at a given time instant).

The functions of the various elements shown in the Figures, including any functional blocks labeled as "means", "means for controlling", "means for transmitting", "means for receiving", "means for transceiving", "means for processing", etc., may be provided through the use of dedicated hardware, such as "a controller", "a transmitter", "a receiver", "a transceiver", "a processor", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes, which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

The invention claimed is:

1. An apparatus for a mobile communication device for providing a sensor input signal to an external machine control entity to control a machine, the apparatus comprising:
   one or more sensor modules for obtaining first user input sensor data and second user input sensor data;
   an interface; and
   a control module configured to:
      control the one or more sensor modules,
      guide the obtaining of the first user input sensor data and/or the second user input sensor data,
         wherein the first user input sensor data and/or the second user input sensor data corresponds to unvalidated user input sensor data; and
         wherein the first user input sensor data corresponds to touch screen coordinates and the second user input sensor data corresponds to angular data of a gyroscope,
      determine the sensor input signal, wherein the determined sensor input signal comprises the first user input sensor data and the second user input sensor data, and
      transmitting the sensor input signal to the machine control entity via the interface, wherein:
         the first and second user input sensor data is processed;
         the first user input sensor data is validated; and
         the second user input sensor data is used to control at least one of:
            a force transmission interface of the machine for an external component,
            a power-take off,
            a valve, and
            an engine of the machine.

2. The apparatus according to claim 1, wherein the force transmission interface is at least one of a mechanical force transmission interface, a hydraulic force transmission interface, and a selective control valve.

3. The apparatus according to claim 1, wherein the machine is one of a vehicle, a tractor, an agricultural machine, and a horticultural machine.

4. The apparatus according to claim 1, wherein the control module is configured to provide the sensor input signal to the machine control entity to abort a currently active functionality of the machine if the sensor input signal comprises information related to an abort gesture within the first user input sensor data from a first sensor module and within the second user input sensor data from a second sensor module.

5. The apparatus according to claim 1, wherein the control module is further configured to obtain a sensor feedback signal from the machine control entity via the interface, wherein the sensor feedback signal is based on the second user input sensor data, and wherein the control module is configured to provide the first user input sensor data to the machine control entity to acknowledge a correctness of the first user input sensor data as indicated by the sensor feedback signal.

6. The apparatus according to claim 5, wherein the second user input sensor data comprises information related to a chosen value, and wherein the first user input sensor data comprises sensor information related to a gesture indicating an acknowledgement, that a representation of the second user input sensor data indicated by the sensor feedback signal is correct.

7. The apparatus according to claim 1, wherein the first user input sensor data additionally corresponds to at least one element of the group of angular data of a gyroscope, acceleration data of an accelerometer, or imaging data of a camera sensor and/or the second user input sensor data additionally corresponds to at least one element of the group of touch screen coordinates, acceleration data of an accelerometer, or imaging data of a camera sensor.

8. A method for a mobile communication device for providing a sensor input signal to an external machine control entity to control a machine, the method comprising:
   obtaining from one or more sensor modules first user input sensor data corresponding to touch screen coordinates;
   obtaining from one or more sensor modules second user input sensor data corresponding to angular data of a gyroscope;
   determining the sensor input signal, wherein the determined sensor input signal comprises the first user input sensor data and the second user input sensor data;
   transmitting the sensor input signal to the machine control entity via an interface, wherein:
      the first and second user input sensor data is processed;
      the first user input sensor data is validated; and
      the second user input sensor data is used to control at least one of:
         a force transmission interface of the machine for an external component,
         a power take-off,
         a valve, and
         an engine of the machine;
   receiving a sensor feedback signal from the machine control entity; and
   guiding the obtaining of first user input sensor data and/or second user input sensor data based on the sensor feedback signal.

9. A non-transitory computer-readable medium storing a program code for performing a method for a mobile communication device for providing a sensor input signal to an external machine control entity to control a machine, when the computer program is executed on a computer, a processor, or a programmable hardware component, the method comprising:
   obtaining from one or more sensor modules first user input sensor data corresponding to touch screen coordinates;
   obtaining from one or more sensor modules second user input sensor data corresponding to angular data of a gyroscope;
   determining the sensor input signal, wherein the determined sensor input signal comprises the first user input sensor data and the second user input sensor data;
   transmitting the sensor input signal to the machine control entity via an interface, wherein:
      the first and second user input sensor data is processed;
      the first user input sensor data is validated; and
      the second user input sensor data is used to control at least one of:
         a force transmission interface of the machine for an external component,
         a power take-off,
         a valve, and
         an engine of the machine;
   receiving a sensor feedback signal from the machine control entity; and guiding the obtaining of first user input sensor data and/or second user input sensor data based on the sensor feedback signal.

\* \* \* \* \*